United States Patent
Yang et al.

(10) Patent No.: US 11,839,813 B2
(45) Date of Patent: Dec. 12, 2023

(54) INTERACTIVE SCENARIO IMPLEMENTATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Ying Yang, Shenzhen (CN); Liping Tan, Shenzhen (CN); Xuejie Hu, Shenzhen (CN); Yongnian Liu, Shenzhen (CN); Xing Zeng, Shenzhen (CN); Yingqi Liu, Shenzhen (CN); Jie Li, Shenzhen (CN); Tong Rui, Shenzhen (CN); Qun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/222,954

(22) Filed: Apr. 5, 2021

(65) Prior Publication Data

US 2021/0220736 A1     Jul. 22, 2021

Related U.S. Application Data

(63) Continuation of application No. PCT/CN2019/126557, filed on Dec. 19, 2019.

(30) Foreign Application Priority Data

Dec. 29, 2018     (CN) .......................... 201811641511.6

(51) Int. Cl.
*A63F 13/47*     (2014.01)
*A63F 13/52*     (2014.01)
(Continued)

(52) U.S. Cl.
CPC .............. *A63F 13/47* (2014.09); *A63F 13/52* (2014.09); *A63F 13/533* (2014.09); *A63F 13/63* (2014.09)

(58) Field of Classification Search
CPC ........ A63F 13/47; A63F 13/52; A63F 13/533; A63F 13/63
See application file for complete search history.

(56) References Cited

U.S. PATENT DOCUMENTS 5,751,953 A * 5/1998 Shiels ..................... A63F 13/47
                                                348/E7.071
5,754,770 A * 5/1998 Shiels ..................... A63F 13/47
                                                348/E7.071
(Continued)

FOREIGN PATENT DOCUMENTS

CN     1380618 A     11/2002
CN     101267865 A    9/2008
(Continued)

OTHER PUBLICATIONS

The European Patent Office (EPO) The Extended European Search Report for 19902457.1 dated Oct. 18, 2021 10 Pages.
(Continued)

*Primary Examiner* — Chase E Leichliter
(74) *Attorney, Agent, or Firm* — ANOVA LAW GROUP, PLLC

(57) ABSTRACT

An interactive scenario implementation method includes: displaying, on a game scenario structure interface, one or more readable game scenario blocks. Each block represents one or more game scenarios that a player has played, and each block has a corresponding game scenario path data stored. The method also includes: determining, according to a scenario skipping instruction triggered by the player through the game scenario structure interface, a skip-origin block and a skip-destination block; updating, upon deter- (Continued)

mining that the skip-origin block is located on a target game scenario path and that skip-origin game scenario path data of the skip-origin block and target game scenario path data of the skip-destination block have connectivity in the game logic, the target game scenario path data according to the skip-origin game scenario path data. A game scenario corresponding to the skip-destination block is entered according to the updated target game scenario path data.

20 Claims, 9 Drawing Sheets

(51) Int. Cl.
*A63F 13/533* (2014.01)
*A63F 13/63* (2014.01)

(56) References Cited

U.S. PATENT DOCUMENTS

| | | | |
|---|---|---|---|
| 5,848,934 A * | 12/1998 | Shiels | A63F 13/47 |
| | | | 348/E7.071 |
| 6,222,925 B1 | 4/2001 | Shiels et al. | |
| 6,261,179 B1 | 7/2001 | Miyamoto et al. | |
| 9,662,581 B2 * | 5/2017 | Kashitani | A63F 13/45 |
| 2007/0066395 A1 | 3/2007 | Harris et al. | |
| 2008/0318676 A1 * | 12/2008 | Ham | A63F 13/10 |
| | | | 463/35 |
| 2011/0059794 A1 * | 3/2011 | Yamaguchi | A63F 13/47 |
| | | | 463/31 |
| 2011/0059798 A1 | 3/2011 | Pryor | |
| 2013/0079155 A1 * | 3/2013 | Kashitani | A63F 13/49 |
| | | | 463/43 |
| 2014/0019865 A1 * | 1/2014 | Shah | G06F 3/0484 |
| | | | 715/731 |
| 2015/0190712 A1 | 7/2015 | Arponen et al. | |
| 2016/0136524 A1 | 5/2016 | Leites et al. | |
| 2016/0274705 A1 | 9/2016 | Kapadia et al. | |
| 2018/0085670 A1 | 3/2018 | Short | |
| 2020/0336804 A1 | 10/2020 | Cui et al. | |
| 2021/0029393 A1 * | 1/2021 | Bermeister | H04N 21/25841 |

FOREIGN PATENT DOCUMENTS

| | | |
|---|---|---|
| CN | 104582807 A | 4/2015 |
| CN | 105617654 A | 6/2016 |
| CN | 108283803 A | 7/2018 |
| CN | 108295468 A | 7/2018 |
| CN | 108769814 A | 11/2018 |
| CN | 109794064 A | 5/2019 |
| WO | 9708632 A2 | 3/1997 |

OTHER PUBLICATIONS

The World Intellectual Property Organization (WIPO) International Search Report for PCT/CN2019/126557 dated Mar. 19, 2020 6 Pages (including translation).

The State Intellectual Property Office of the People's Republic of China (SIPO) Office Action 2 for 201811641511.6 dated May 11, 2020 8 Pages (including translation).

* cited by examiner

INTERACTIVE SCENARIO IMPLEMENTATION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2019/126557, filed on Dec. 19, 2019, which claims priority to Chinese Patent Application No. 201811641511.6, entitled "INTERACTIVE SCENARIO IMPLEMENTATION METHOD AND APPARATUS, TERMINAL, AND STORAGE MEDIUM" filed on Dec. 29, 2018, both of which are incorporated herein by reference in their entirety.

FIELD OF THE TECHNOLOGY

The present disclosure relates to the field of computer technologies, and specifically, to an interactive scenario implementation method and apparatus, a computer device, and a storage medium.

BACKGROUND OF THE APPLICATION

An adventure type game is usually a game in which a player controls a role to perform a virtual adventure and whose story scene usually occurs in the form of completing a task, making a choice, or solving a puzzle or in another form. In the type of game, a player controls a role to generate an interactive story, and the type of games focus on story clue discovery and the like.

For example, the adventure type game may provide different choices of story scenario development to the player; and in the game, the player can independently decide a behavior of a role, create a story belonging to the player, or develop a story scene. Different choices may lead to different story scenes and story lines.

However, game scenario skipping cannot be implemented in the adventure type game currently. For example, the player may have played and experienced a first set of game scenes in the current play progress, if the player loads a play progress earlier than the current play progress (e.g., reverts to an earlier game scene) and makes a different choice, the story line may be developed differently but some game scenes may be the same as the first set of game scenes. In existing adventure type games, the player has to replay or re-watch the repetitive scenes with no skipping option.

SUMMARY

Embodiments of the present disclosure provide an interactive scenario implementation method and apparatus, a computer device, and a storage medium, to implement game scenario skipping.

An embodiment of the present disclosure provides an interactive scenario implementation method, including: displaying, on a game scenario structure interface, one or more readable game scenario blocks, each block representing one or more game scenarios that a player has played, and each block having a corresponding game scenario path data stored; receiving a scenario skipping instruction triggered by the player through the game scenario structure interface; determining, according to the scenario skipping instruction, a skip-origin block and a skip-destination block, target game scenario path data of the skip-destination block including a target game scenario path; updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

An embodiment of the present disclosure further provides a non-transitory storage medium, storing a plurality of instructions, the instructions being configured to be loaded by a processor and cause the processor to perform a plurality of operations. The operations include: displaying, on a game scenario structure interface, one or more readable game scenario blocks, each block representing one or more game scenarios that a player has played, and each block having a corresponding game scenario path data stored; receiving a scenario skipping instruction triggered by the player through the game scenario structure interface; determining, according to the scenario skipping instruction, a skip-origin block and a skip-destination block, target game scenario path data of the skip-destination block including a target game scenario path; updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

Moreover, an embodiment of the present disclosure further provides a computer device, including a processor and a memory, the memory storing a plurality of instructions; and the processor loading the instructions from the memory, to perform a plurality of operations. The operations include: displaying, on a game scenario structure interface, one or more readable game scenario blocks, each block representing one or more game scenarios that a player has played, and each block having a corresponding game scenario path data stored; receiving a scenario skipping instruction triggered by the player through the game scenario structure interface; determining, according to the scenario skipping instruction, a skip-origin block and a skip-destination block, target game scenario path data of the skip-destination block including a target game scenario path; updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

BRIEF DESCRIPTION OF THE DRAWINGS

To describe the technical solutions in the embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The technical solutions in the embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

The embodiments of the present disclosure provide an interactive scenario implementation method and apparatus, a computer device, and a storage medium.

Figure 1A:
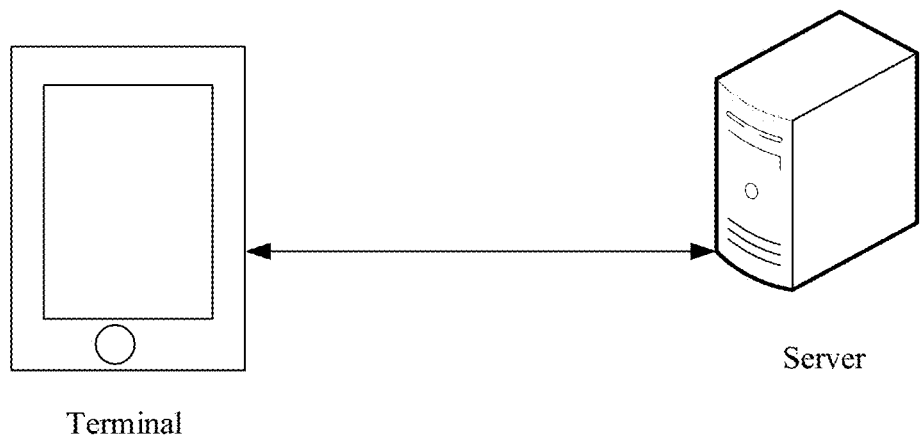
FIG. 1A is a schematic diagram of a scenario of an interactive scenario implementation method according to an embodiment of the present disclosure.

The interactive scenario implementation apparatus may be specifically integrated in a terminal, and the terminal may be a device such as a mobile phone, a tablet computer, a notebook computer, or a mini-box. For example, referring to FIG. 1A, the terminal may display a game scenario structure interface, the game scenario structure interface including several readable game scenario blocks that a player has played, each game scenario block corresponding to one or more game scenarios, and each readable game scenario block correspondingly storing game scenario path data; receive a scenario skipping instruction triggered by the player through the game scenario structure interface; determine, according to the scenario skipping instruction, a skip-origin block and a skip-destination block that needs to be skipped to, the skip-destination block correspondingly storing target game scenario path data including a target game scenario path; determine, when determining that the skip-origin block is located on the target game scenario path, whether skip-origin game scenario path data stored in the skip-origin block and the target game scenario path data have connectivity in game logic; update, when having connectivity, the target game scenario path data according to the skip-origin game scenario path data; and enter a game scenario corresponding to the skip-destination block according to updated target game scenario path data. For example, the terminal may obtain target game scenario data and other data from a server according to the updated target game scenario path data and perform playing and the like.

Detailed descriptions are separately performed below. Sequence numbers of the following embodiments are not intended to limit preference orders of the embodiments.

Figure 1B:
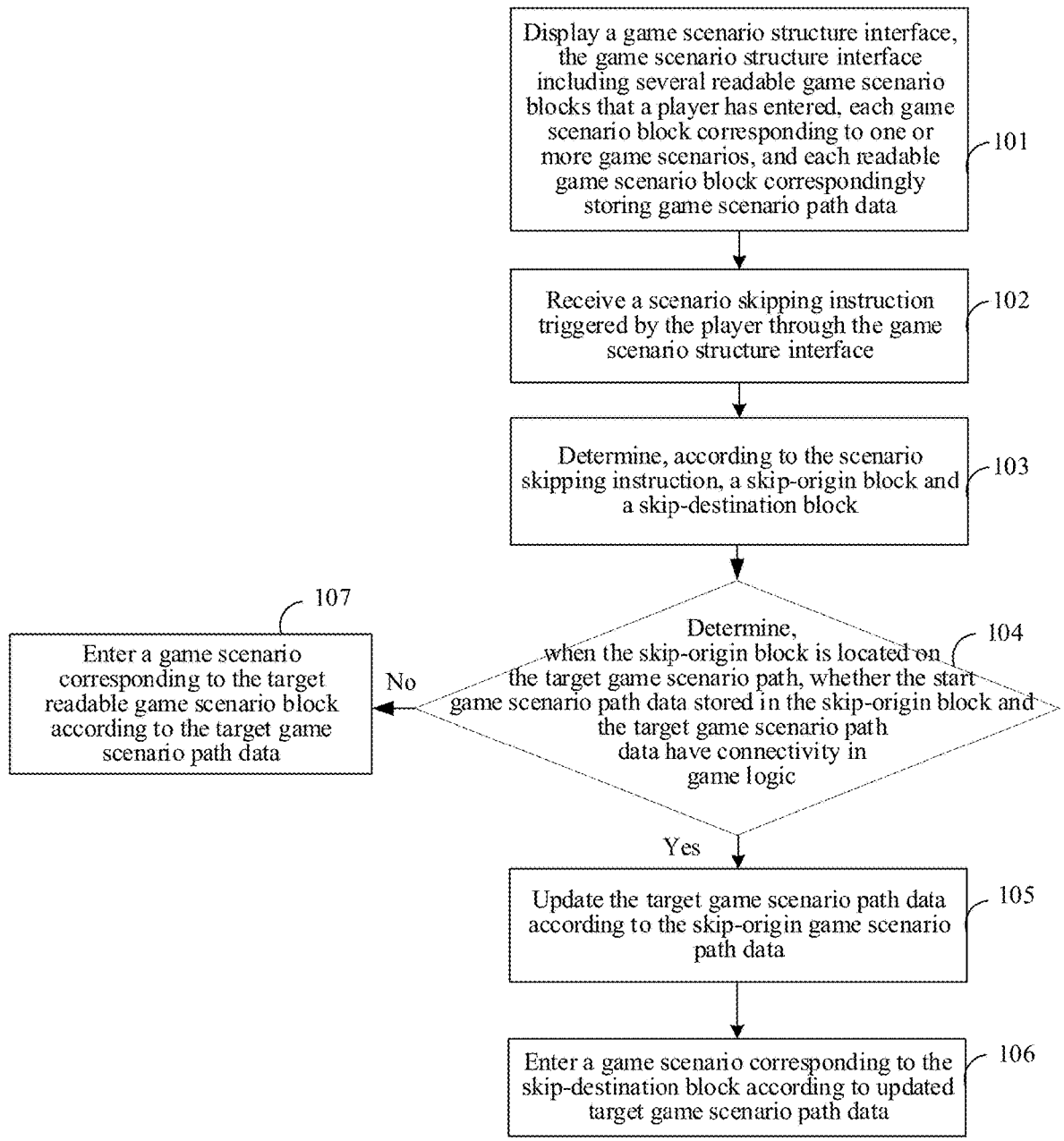
FIG. 1B is a schematic flowchart of an interactive scenario implementation method according to an embodiment of the present disclosure.

In an embodiment, an interactive scenario implementation method is provided, and the method may be performed by a processor of a terminal, or performed by a processor of a terminal in combination with a processor of a server. As shown in FIG. 1B, a specific process of the interactive scenario implementation method may be as follows:

101. Display a game scenario structure interface, the game scenario structure interface including several readable game scenario blocks that a player has played, each game scenario block corresponding to one or more game scenarios, and each readable game scenario block correspondingly storing game scenario path data.

Games in the embodiments of the present disclosure may include adventure type games, interaction narration type games, interactive scenario type games, interaction video type games (for example, interaction movies), interaction music type games or other games having scenarios. For example, a large game story framework may be set for a game, a plurality of game scenario blocks may be set for the game story framework, each game scenario block corresponds to one or more game scenarios or scenes (for example, movie scenarios); and the game scenario blocks may be connected together according to a specific scenario logic or rule, thereby forming a corresponding game story. For example, the player may perform an interaction operation in a game, the terminal may develop corresponding game scenarios based on the interaction operation of the player, and connect some game scenarios in series, thereby creating, under the large game story framework, game story scenes belonging to the player.

In one embodiment of the present disclosure, a readable game scenario block may be a game scenario block whose path data is stored on the server. The server may consider a readable game scenario block as a data storage node, and store game scenario path data thereof. The game scenario path data may include a game scenario path (which may include scenario block information on a path, that is, node information such as a node identifier), game archive information (for example, game archive time information), and a game logic parameter. The server may further store various information of each readable game scenario block, the information including: a node identifier/identifier, a video included by a node (for example, including information about a video file such as a name and a link), whether the node is traceable, a node type (ending, death ending, chapter clearance or the like), and the like. Additionally, the terminal or the server may further store information about game scenario blocks generated in a game process, for example, node start (representing that the player starts a game scenario block), node finish (representing that the player finishes a game scenario block), and node having been watched but not finished (representing that the player is in a game scenario block). One game scenario block may include one video.

In some embodiments, the server may store game archive information of each readable game scenario block, and the game archive information may include game scenario path data and the like, that is, the game scenario path data is stored in a game archive.

A game scenario path is a scenario route experienced by the player entering a game scenario corresponding to the game scenario block, and the game scenario path may include the game scenario block that the player passes through. The game logic parameter may include a game parameter corresponding to the player when reaching the game scenario corresponding to the game scenario block, for example, a game parameter value corresponding to a time when the player reaches the game scenario block, such as a prop parameter or a preference value. Moreover, the game logic parameter may further include game judgment information on the game scenario path, such as, game parameter judgment information on the game scenario path, judgment information about entering a next game scenario, or prop obtaining judgment information.

In an embodiment, a game scenario block may be a readable game scenario block or another type of game scenario block such as an unreadable game scenario block. The unreadable game scenario block is a game scenario block whose game scenario path data or game archive information is not stored on the server. When the player triggers to enter an unreadable game scenario block, because the server does not store game scenario path data or game archive information of the unreadable game scenario block, the player may fail to enter a scenario. Therefore, in some embodiments, no entry is set for the unreadable game scenario block.

Unreadable game scenario blocks may include: a value game scenario block (a scenario block of which only a game value is stored) and a pure game scenario block. The pure game scenario block is a game scenario block of which only game scenario information is stored on the server, such as, a scenario block of which only a game ending scenario is stored or a scenario block of which only a transitional scenario is stored.

In one embodiment of the present disclosure, in the game scenario structure interface displayed on the terminal, a shape of a game scenario block may be set according to actual requirements. For example, the shape may be a rectangle, a circle, a polygon, or another irregular shape.

The game scenario structure interface is used for presenting an entire game scenario structure to the player, and the player may understand, through the game scenario structure interface, a game scenario experienced by the player, a game scenario route of the player, an association between game scenarios, and the like. For example, the game scenario structure interface may be a game story line interface. In one embodiment of the present disclosure, the game scenario structure interface may include a game scenario block that the player previously has entered and that stores data, that is, a historical readable game scenario block, so that the player may again choose to enter a scenario of the historical game scenario block.

The historical readable game scenario block corresponds to one or more game scenarios, and corresponds to a node storing historical game scenario path data that may, for example, include: a scenario path corresponding to the player when reaching the game scenario block at a historical time point, and a game logic parameter (for example, a prop parameter, a preference, or game judgment information) corresponding to the player when reaching the game scenario block at a historical time point.

Figure 1C:
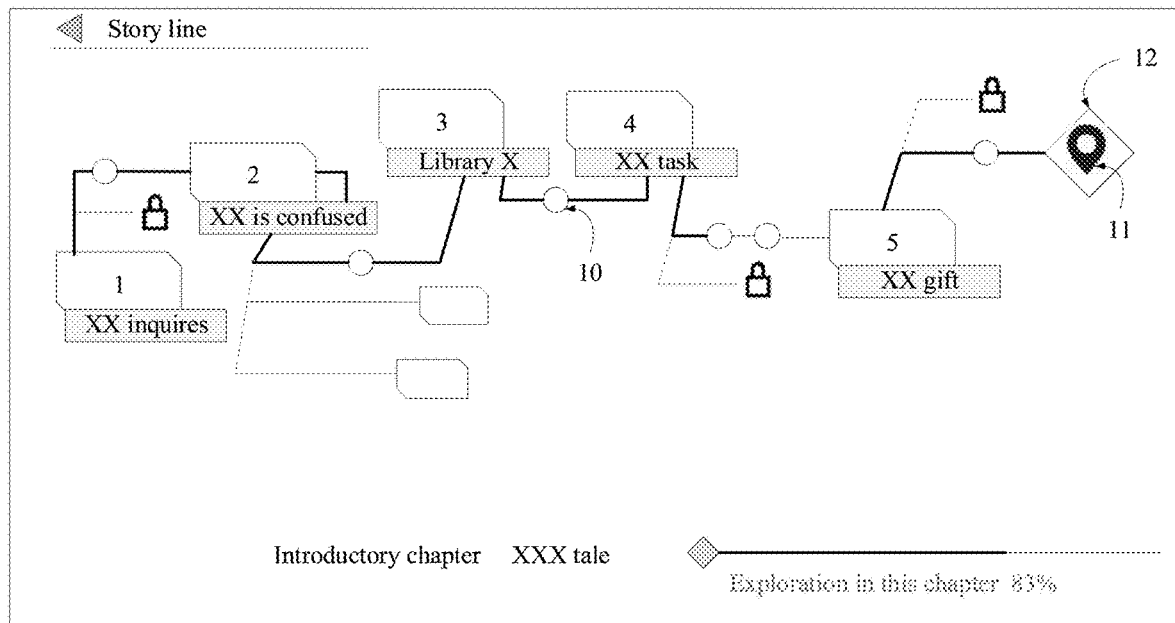
FIG. 1C is a schematic diagram of a game story line interface according to an embodiment of the present disclosure.

For example, referring to FIG. 1C, when the player intends to re-play a previous scenario or watch a game scenario structure such as a game story line, the player may trigger the terminal to display a game story line interface, where the interface presents an entire scenario structure, including readable game scenario blocks that the player has unlocked and entered, such as, scenario blocks 1, 2, 3, and 4. The interface further includes an unreadable game scenario block (that is, what is shown by a circle 10 in the interface, the circle represents the unreadable game scenario block) such as a value game scenario block, and a node on the server corresponding to the value game scenario block stores game data such as value=1 or 0.

To help the player understand a previously experienced scenario path, in an embodiment, all paths experienced by the player may be further presented on the game scenario structure interface. For example, a scenario path experienced previously by the player before reaching all readable game scenario blocks may be presented, and a scenario path experienced by the player before reaching a current game scenario block may be also presented.

The current game scenario block is a game scenario block currently reached by the player. For example, when the player currently reaches/proceeds to a scenario of a game scenario block 5, the current game scenario block is the game scenario block 5. The current game scenario block may be a readable game scenario block or another type of game scenario block such as an unreadable game scenario block. In an embodiment, a current game scenario block may be displayed in a current game scenario structure interface. For example, referring to FIG. 1C, the game scenario structure interface simultaneously displays the current game scenario block 5 and the game scenario blocks 1, 2, 3, and 4.

In an embodiment, alternatively, the current game scenario block may not be displayed in the current game scenario structure interface. For example, a readable game scenario block displayed in the game scenario structure interface is a game scenario block under the same game story chapter. When the current game scenario block is a game scenario block under another game story chapter, the current game scenario block is not displayed in the game scenario structure interface.

In another example, in an embodiment, when a quantity of game scenario blocks displayed in the game scenario structure interface is limited, the current game scenario structure interface may be incapable of displaying a relatively large quantity of game scenario blocks. In this case, the current game scenario block is not displayed in the current game scenario structure interface. The user operates the game scenario structure interface to view other game scenario blocks that are not displayed and that the player has played (including a readable game scenario block, an unreadable game scenario block, and the like).

For example, the player may operate an area at a side edge of the game scenario structure interface, to view other game scenario blocks not displayed.

There may be a plurality of path presentation manners. For example, in an embodiment, the terminal may draw a scenario path in the game scenario structure interface, thereby presenting the scenario path. For example, a scenario route may be formed by connecting game scenario blocks on a path in series by using a line and be presented.

In an embodiment, to display, on the terminal, a scenario path that the player passes through, when the game scenario structure interface needs to be displayed, for example, when a scenario structure display instruction is received, the terminal may transmit the scenario structure display instruction to the server, the server may read, from a memory of the server, a current game scenario path corresponding to the player when reaching a current game scenario block, and a historical game scenario path corresponding to the player when reaching a readable game scenario block. Then, the current game scenario path and the historical game scenario path of the player are transmitted to the terminal, and the terminal draws a read game scenario path in the game scenario structure interface.

Because the server stores game scenario path data of each readable game scenario block, a path corresponding to the player when reaching a readable game scenario block may be read from a node corresponding to the readable game scenario block stored in the server. When a current game scenario block is a readable game scenario block, a current game scenario path corresponding to the player when reaching the current game scenario block may alternatively be read from a node corresponding to the current game scenario block.

For example, in an embodiment, the step of "displaying a game scenario structure interface" may include:

reading a current game scenario path of a current game scenario block when receiving a scenario structure display instruction, and reading, from a node corresponding to a readable game scenario block, a historical game scenario path corresponding to the player when reaching the readable game scenario block;

drawing the current game scenario path and the historical game scenario path in the game scenario structure interface; and displaying the game scenario structure interface after the drawing.

There are a plurality of path drawing manners. For example, the current game scenario path or the historical game scenario path may be drawn by using a line or by connecting drawing mediums. For example, the step of "drawing the current game scenario path and the historical game scenario path in the game scenario structure interface" may include:

connecting game scenario blocks on the current game scenario path in series in the game scenario structure interface by using a first line; and connecting game scenario blocks on the historical game scenario path in series in the game scenario structure interface by using a second line.

In this case, the game scenario structure interface after the series connection may be displayed, and the player can see the current game scenario path and the historical game scenario path, to help the player understand a game progress situation of the player and select a game scenario block that needs to be re-played.

The first line and the second line may be different lines such as lines of different thicknesses or lines in different colors, and may be set according to actual requirements.

For example, referring to FIG. 1C, a scenario route corresponding to the player when reaching the current game scenario block (for example, the scenario block 5), and a scenario route of the player when previously reaching other readable game scenario blocks (for example, the scenario blocks 1, 2, 3, and 4) are displayed in the game story line interface. The game story line interface may display, through a black line, a scenario route experienced by the player when reaching the current game scenario block (for example, the game scenario block 5).

As shown in FIG. 1C, the terminal may connect, by using a line, game scenario blocks (for example, readable game scenario blocks or value scenario blocks) on a path experienced by the player when reaching the current game scenario block (or a path experienced by the player when reaching a readable game scenario block) in series, to form a current route corresponding to the player when reaching the current game scenario block (or a historical route corresponding to the player when reaching the readable game scenario block).

In one embodiment of the present disclosure, there are a plurality of manners of displaying the game scenario structure interface. For example, the game scenario structure interface may be displayed according to a scenario structure display instruction when the terminal receives the scenario structure display instruction. The scenario structure display instruction may be triggered in a plurality of manners. For example, generation of the scenario structure display instruction may be triggered when the game is played. For example, when the terminal displays a game interface, the player may trigger a story line display instruction through the game interface. That is, the step of "displaying a game scenario structure interface" may include:

receiving a scenario structure display instruction triggered by the player through a game interface; and returning to display the game scenario structure interface according to the scenario structure display instruction.

The game interface is used for displaying a game scenario corresponding to a game scenario block that the player currently enters (that is, the current game scenario block), and the player may perform an interaction operation and play the game in the game interface. For example, the player may select a scenario development direction and obtain a prop through a selection operation in the game interface.

Figure 1D:
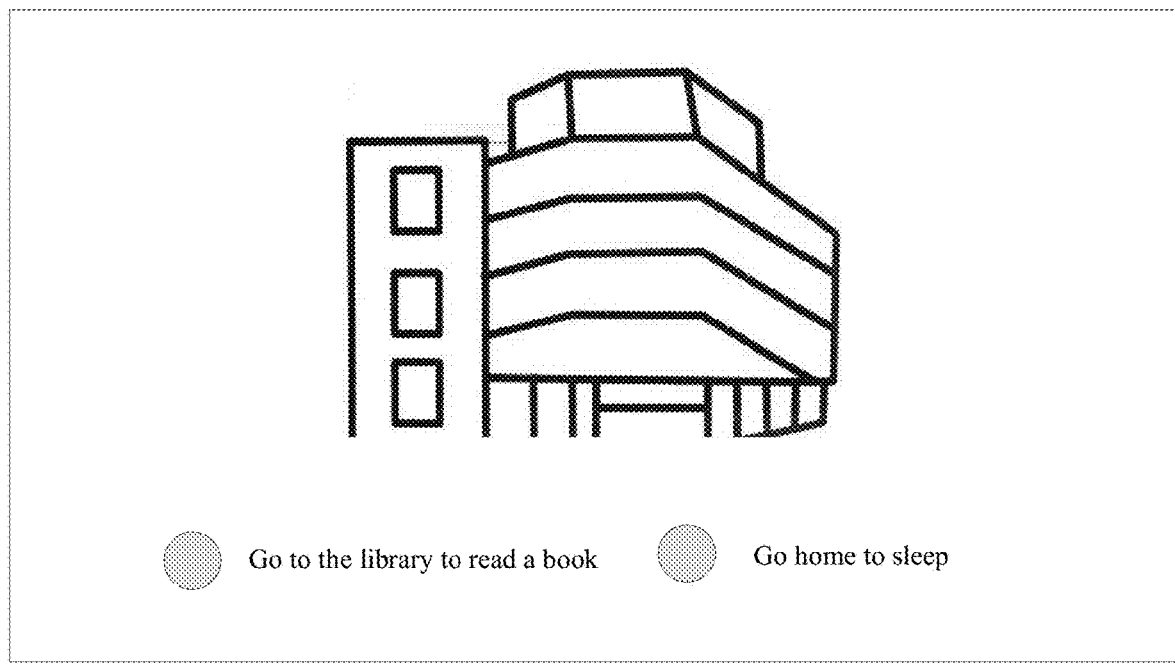
FIG. 1D is a schematic diagram of a game scenario interface according to an embodiment of the present disclosure.

For example, referring to FIG. 1D, when the player enters a scenario corresponding to a readable game scenario block (e.g., block 2), the game may develop and move to a scenario option selection interface as shown in FIG. 1D, and a scenario option such as "go to the library to read a book" or "go home to sleep" may be displayed in the game interface, and the player may select the scenario option to develop the corresponding scenario. For example, the player may click/tap "go to the library", thereby entering a game scenario block "go to the library to read a book" (e.g., which establishes a game path from block 2 to block 3).

There are a plurality of manners of triggering the scenario structure display instruction. For example, in an embodiment, a scenario structure display interface may be set on the game scenario structure interface, and the player may trigger the scenario structure display instruction through the scenario structure display interface. The scenario structure display interface may be represented in a plurality of forms such as an icon button form.

In an embodiment, a readable game scenario block displayed in the game scenario structure interface may be a readable game scenario block under a game scenario sub-framework, such as, a readable game scenario block under a game scenario chapter.

For example, referring to FIG. 1C, the game story line interface displays a plurality of readable game scenario blocks (1, 2, 3, 4, 5 . . . ) and a game parameter scenario block (a scenario block represented by the circle 10) in an introductory chapter.

In an embodiment, to help the player understand information about a game scenario, the terminal may further display digest information of a scenario corresponding to each readable game scenario block in the game scenario structure interface. The digest information of the scenario may include digest text information and a digest image. For example, each readable game scenario block in the game story line interface displays a text digest and a digest image of a scenario. Referring to FIG. 1C, each of the scenario blocks 1, 2, 3, 4, and 5 has a text digest "XX is confused" and an image "1" of each of respective scenarios.

In an embodiment, to help the player understand a game progress of the player, the terminal may further display current game progress information of the player in the game scenario structure interface. The game progress information may include: a percentage of a scenario experienced by the player to a total scenario, a percentage of a scenario experienced in a game chapter to a total scenario of the game chapter, a scenario exploration extent in a game chapter, or the like.

In an embodiment, the terminal may further display, in the game scenario structure interface, a game story chapter in which the player is currently located, and may display, for example, a chapter and a chapter name, for example, "Introductory chapter: XXX tale" and "Eleventh chapter: XX story".

In an embodiment, the terminal may further display, in the game scenario structure interface, a game parameter judgment identifier (which may be a game system judgment identifier in other embodiments), which may include a game parameter value judgment identifier such as a prop parameter judgment identifier, a preference parameter judgment identifier, or a player behavior value judgment identifier. The identifier may be represented in a plurality of forms, and may be in a judgment block form. For example, referring to FIG. 1C, the identifier may be in a judgment box form. A judgment box (shown by a mark number 12) in FIG. 1C represents that the server (also referred to as a system) performs a parameter judgment in the location.

In an embodiment, a current location identifier 11 of the player may be further displayed in the game scenario structure interface, and the current location identifier is used for identifying a current location of the player in a game story framework (for example, a story line); and the current location of the player may be in a game scenario. In this case, the current location identifier of the player may be displayed in the game scenario block. Moreover, the current location of the player may alternatively be in a game parameter judgment. In this case, the current location identifier of the player may be displayed in the game parameter judgment block. For example, referring to FIG. 1C, the current location of the player is in a value judgment. In FIG. 1C, the current location identifier 11 may be displayed in the value judgment box 12.

In an embodiment, to ensure data accuracy, the server may update data stored in a node corresponding to a readable game scenario block. Specifically, the server may update, in a game process when the player enters a game scenario corresponding to a readable game scenario block, game scenario path data stored in a node corresponding to the readable game scenario block, based on current game scenario path data corresponding to the player when reaching the readable game scenario block.

For example, before scenario skipping or after scenario skipping, if a game scenario block entered by the player is a readable game scenario block, the server needs to update skip-originally stored game scenario path data of the readable game scenario block by using current game scenario path data of the player. When the player reaches a readable game scenario block for the first time, data skip-originally stored in a node corresponding to the readable game scenario block is empty.

102. Receive a scenario skipping instruction triggered by the player through the game scenario structure interface.

There are a plurality of manners of triggering a scenario skipping instruction. For example, in an embodiment, after the terminal displays the game story line interface, the player may perform a scenario skipping operation in the game scenario structure interface, to trigger a corresponding scenario skipping instruction.

In another example, in an embodiment, the player may perform a scenario entering operation for a readable game scenario block, to trigger a scenario skipping instruction. The scenario skipping operation may be set to an operation such as a click/tap operation (including a mouse click operation, a user tap operation, or the like) or a slide operation according to actual requirements. The terminal may trigger a scenario skipping instruction based on a detected skipping operation performed by the player for a readable game scenario block, where the instruction may indicate a skip-destination block that needs to be entered, and may include a node identifier of a node corresponding to the skip-destination block. For example, the indicated skip-destination block may be a readable game scenario block operated by the player.

103. Determine, according to the scenario skipping instruction, a skip-origin block and a skip-destination block that needs to be skipped to.

The terminal may transmit the scenario skipping instruction to the server. The server determines, according to the scenario skipping instruction, the skip-origin block and the skip-destination block that needs to be skipped to.

For example, when the terminal enters a game scenario block, and starts to play a video corresponding to the game scenario block, the terminal may report an identifier and start information of the game scenario block to the server, and report, when detecting that the video corresponding to the game scenario block is played completely, the identifier and finish information of the game scenario block. Between the two, the game scenario block is in an uncompleted state, that is, in progress. The server obtains the identifier, the start information, and the finish information of the game scenario block through reporting of the terminal, then learns game scenario blocks that the player passes through, and may record a game path that the player passes through.

When determining that a playing instruction is not to continue to play in the current location, the server considers the playing instruction as a skipping instruction. For example, when the player stops playing a video corresponding to a current game scenario block, a playing location of the video file may be recorded. When the player enters another game scenario block through a click/tap operation on the game scenario structure interface, and plays another video, if the server compares node information such as node identifiers of two game scenario blocks, to confirm that the two game scenario blocks are different, the click/tap operation of the user is considered as a scenario skipping instruction.

The skip-origin block is a start-point game scenario block of scenario skipping. For example, when skipping needs to be performed from the game scenario block 1 to the game scenario block 5, the game scenario block 1 is a skip-origin block.

Skip-origin blocks may be of a plurality of types, and for example, may include: a readable game scenario block, a game parameter scenario block, a parameter judgment block, or another type of scenario block.

A manner of determining the skip-origin block may be set according to actual requirements. For example, the server may take a game scenario block currently reached by the player as a skip-origin block, that is, the skip-origin block may be the current game scenario block.

In another example, in an embodiment, the server may select, from game scenario blocks before the current game scenario block according to a preset rule, a corresponding scenario block as the skip-origin block. For example, a readable game scenario block that is located before the current game scenario block and that is most recent relative to the current game scenario block may be selected as the skip-origin block.

For example, in an embodiment, when a current game scenario block entered by the player at a current time point is an unreadable game scenario block such as a game finish scenario block, a game parameter scenario block, or an interaction operation scenario block, the server may determine a historical readable game scenario block temporally closest to the game scenario block time as the skip-origin block. For example, if the player performs scenario skipping when entering the game finish scenario block, the server may determine that a previous readable game scenario block of the game finish scenario block is the skip-origin block.

The skip-destination block is the readable game scenario block that needs to be skipped to, that is, a skip-destination block to which the player intends to perform scenario skipping. For example, if the player intends to skip from the game scenario block 1 to the readable game scenario block 5, the readable game scenario block 5 is the skip-destination block.

In an embodiment, the scenario skipping instruction triggered by the player may indicate the skip-destination block that needs to be skipped to, and therefore the server may determine the skip-destination block directly based on the scenario skipping instruction. For example, referring to FIG. 1C, when clicking/tapping the readable game scenario block 5 on the game story line interface, the player triggers the scenario skipping instruction, the instruction indicating that the skip-destination block that needs to be skipped to is the readable game scenario block 5.

A node corresponding to the skip-destination block stores target game scenario path data, the target game scenario path data including: a target game scenario path experienced by the player when reaching the skip-destination block, and a game logic parameter. The game logic parameter may include: a player game parameter (for example, a prop value or a preference value) corresponding to the player when reaching the skip-destination block, and a parameter judgment status corresponding to the player game parameter (for example, a judgment of a preference value).

104. Determine, when determining that the skip-origin block is located on the target game scenario path, whether skip-origin game scenario path data stored in the skip-origin block and the target game scenario path data have connectivity in game logic. When having connectivity, step 105 is performed, and when having no connectivity, step 106 is performed.

In one embodiment of the present disclosure, scenario skipping from the skip-origin block to the skip-destination block may be divided into two types of scenario skipping. One type is direct scenario skipping, that is, an effect generated by the skip-origin game scenario path data on the target game scenario path data is not considered, skipping from the skip-origin block to a game scenario of the skip-destination block is performed directly based on the target game scenario path data, which is equivalent to performing an archive reading operation on data stored in the skip-destination block. The other type is chain effect scenario skipping, the skipping needs to consider a chain effect generated by the skip-origin game scenario path data on the target game scenario path data, and skipping to a game scenario of the skip-destination block is performed with reference to the skip-origin game scenario path data and the target game scenario path data.

Which type of scenario skipping is selected further needs to be considered from two aspects. For example, in one aspect, whether a path from the skip-origin block (for example, the current game scenario block) to the skip-destination block exists needs to be considered; and in the other aspect, when a path from the skip-origin block to the skip-destination block exists, whether this path is passable in game logic, that is, whether the path has connectivity in game logic further needs to be determined.

That is, in the game, if a path from the skip-origin block to the skip-destination block exists, and the path has connectivity in game logic, chain effect skipping whose start data generates a chain effect on the target data may be used.

Figure 2A:
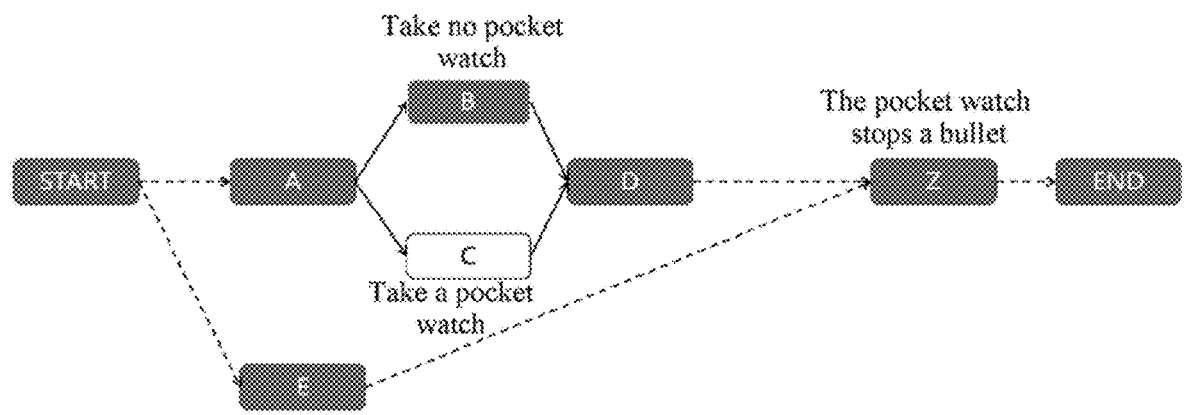
FIG. 2A is a schematic diagram of a game scenario route represented by using nodes according to an embodiment of the present disclosure.

FIG. 2A is a schematic diagram of a game scenario route represented by using nodes according to an embodiment of the present disclosure. For example, a pocket watch is taken in a game. Referring to FIG. 2A, in the game, a player does not take the pocket watch, and consequently the game is over. In this case, paths recorded by a server for nodes (that is, corresponding to readable game scenario blocks) are as follows:

Point A: A path of START=>A is recorded.
Point B: A path of START=>A=>B is recorded.
Point D: A path of START=>A=>B=>D is recorded.
Point C: The end is not reached, and therefore there is no path.
Point Z: A path of START=> . . . =>Z is recorded.

Because the nodes record, on the server, data of paths experienced by the player (equivalent to that all the nodes store game archive data), the player may perform tracing (i.e., backtracking) by using the path data (for example, the archive data) stored in the nodes. The tracing is that the player replays the game by using the path data (the archive data) stored in the nodes.

It is assumed that, the player may revert back (i.e., trace) to the point A through archive reading, again select the point C, to take the pocket watch, and go to the point D. Then, a game story line becomes a story line shown in FIG. 2B. Paths recorded for nodes are as follows:

Point A: A path of START=>A is recorded.
Point B: A path of START=>A=>B is recorded.
Point D: A path of START=>A=>C=>D is recorded.
Point C: A path of START=>A=>C is recorded.
Point Z: A path of START=> . . . =>Z is recorded.

However, a path of START=>A=>C=>D . . . =>Z does not exist yet. There is no guarantee that the story can be skipped/jumped from D to Z, and the path of START=>A=>C=>D . . . =>Z is not necessary a feasible path.

According to one embodiment of the present disclosure, because a storage amount and a computing amount for recording all paths of the user are huge, and a large quantity of computer storage resources and computing resources need to be consumed, the server may store only most recent paths of all traceable points. A traceable point is a point that may be clicked/tapped to restart on a game scenario structure interface. For example, after the pocket watch is taken in FIG. 2B, paths recorded for the point D and the point Z are most recent paths, and a path when the pocket watch is not taken is no longer retained. In this way, a storage amount and a computing amount for recording paths are greatly reduced, and therefore consumption of computer storage resources and computing resources is reduced.

First, the player walks on this path of A=>C=>D that has no relationship with the skip-original path of START=> . . . =>Z. If the player intends to skip from the node D to the node Z, the server needs to consider problems in two aspects:

First, this path of ROOT=>A=>C=>D does not necessarily reach point Z. For example, if a path to the point Z is START=> . . . =>E=> . . . =>Z, a path from the point D to the point Z does not exist at all. Second, even if a path of START=>A=>C=>D=> . . . =>Z to Z exists, a problem of game logic further needs to be considered, and the path START=>A=>C=>D=> . . . =>Z may be impassable in game logic (e.g., because the game character has not accumulated enough material to reach Z, or because the game character at point D has a first status but the required status of the game character at point Z is a second status).

Therefore, if skipping from the node D to the node Z needs to be performed, a path from the node D to the node Z such as START=>A=>C=>D=> . . . =>Z needs to exist, and it further needs to be ensured that START=>A=>C=>D=> . . . =>Z can have connectivity in game logic.

During actual application, to improve efficiency, for proving whether a path from the point D to the point Z such as START=>A=>C=>D=> . . . =>Z exists, the server may perform determining by determining whether the point D is on a path to the point Z. For example, when the point D is on a path to the point Z, a path from the point D to the point Z inevitably exists; otherwise, a path from the point D to the point Z does not exist.

During actual application, to improve efficiency, whether the path of START=>A=>C=>D=> . . . =>Z to Z can be logically passable may be proved depending on whether path data of the point D and path data of the point Z have connectivity in game logic (i.e., is logically valid or logically consistent); and when the path data has connectivity, the server determines that the path of START=>A=>C=>D=> . . . =>Z to Z is passable; otherwise, impassable.

Based on the foregoing analysis, in one embodiment of the present disclosure, the chain effect skipping manner may be used only when the skip-origin block is located on the target game scenario path and the skip-origin game scenario path data and the target game scenario path data have connectivity in game logic.

There are a plurality of manners of determining whether the skip-origin block is located on the target game scenario path. For example, in an embodiment, the server may perform determining based on a stored scenario block identifier on the target game scenario path and a skip-origin block identifier. When a scenario block identifier the same as the skip-origin block identifier exists on the path, the server determines that the skip-origin block is located on the target game scenario path.

In another example, in an embodiment, to improve efficiency, the server may determine, in a manner finding an intersection of two scenario paths, whether the start scenario block is located on the target scenario path. Specifically, the step of "determining, when determining that the skip-origin block is located on the target game scenario path, whether skip-origin game scenario path data stored in the skip-origin block and the target game scenario path data have connectivity in game logic" may include:

finding an intersection of the target game scenario path and a skip-origin game scenario path, to obtain an intersection block;

determining, when the intersection block includes the skip-origin block, that the skip-origin block is located on the target game scenario path; and determining whether the skip-origin game scenario path data stored in the skip-origin block and the target game scenario path data have connectivity in game logic.

In an embodiment, when determining that the intersection block does not include the current game scenario block, it is determined that the current game scenario block is not on the target game scenario path.

For example, in a scenario in which the foregoing pocket watch stops a bullet, an intersection is first found, that is, an intersection of the path of START=>A=>B=>D and the path of START=> . . . >Z is found, to see whether the point D can be obtained through calculation. If the point D may exist, it proves that START=>A=>C=>D=> . . . =>Z exists. Then, it is determined that START=>A=>C=>D=> . . . =>Z is passable in game logic.

According to the foregoing introduction, in one embodiment of the present disclosure, whether the skip-origin game scenario path data and the target game scenario path data have connectivity in game logic may be determined, to prove whether a path from the skip-origin block to the skip-destination block is logically passable.

In an embodiment, given that in an actual game, data for determining that path data has connectivity is usually game logic parameters in the path data, whether the skip-origin game scenario path data and the target game scenario path data have connectivity in game logic may be determined based on the skip-origin game logic parameter and the target game logic parameter. For example, when the skip-origin game logic parameter and the target game logic parameter are interconnected in game logic, it may be determined that the skip-origin game scenario path data and the target game scenario path data have connectivity; and when the skip-origin game logic parameter and the target game logic parameter are not interconnected in game logic, it may be determined that the skip-origin game scenario path data and the target game scenario path data have no connectivity.

Specifically, whether logic parameters are interconnected may be determined by comparing game logic parameters. For example, in an embodiment, the step of "determining whether the skip-origin game scenario path data stored in the skip-origin block and the target game scenario path data have connectivity in game logic" may include:

comparing the skip-origin game logic parameter with the target game logic parameter, to obtain a comparison result;

determining, according to the comparison result, whether the skip-origin game logic parameter and the target game logic parameter are interconnected in game logic; and determining, when being interconnected, that the skip-origin game scenario path data and the target game scenario path data have connectivity in game logic.

In this embodiment of the present disclosure, that the path data has connectivity in game logic may mean: the current game logic parameter of the current game scenario block and the target game logic parameter of the skip-destination block are interconnected in game logic. For example, the skip-origin game logic parameter and the target game logic parameter have consistency or inheritability in game logic.

For example, in an embodiment, if the server determines that the type of the current game logic parameter and the type of the target game logic parameter are consistent, it is considered that the parameters are interconnected and the path data has connectivity; otherwise, it is considered that the parameters are not interconnected and the path data has no connectivity.

In another example, in an embodiment, when the target game logic parameter includes a player game parameter (for example, a prop parameter or a preference parameter), and another game parameter that may affect the player game parameter (for example, a judgment of the player game parameter), it may be considered that the parameters are not interconnected and the path data has no connectivity; and when the target game logic parameter includes the player game parameter, the current game logic parameter includes the player game parameter, and no other game parameter affecting the player game parameter exists, it may be considered that the parameters are interconnected and the path data has connectivity.

For example, if the skip-origin game logic parameter includes only a game value Y=1, and the target game logic parameter includes only a game value Y=0, it may be considered that the game logic parameters are logically interconnected (the target game logic parameter may inherit the current game logic parameter), and the skip-origin game scenario path data and the target game scenario path data have connectivity.

In another example, if the skip-origin game logic parameter includes a player game value Y=1, and the target game logic parameter includes a player game value Y=0, or parameter judgment condition of Y, it may be considered that the logic parameters are not interconnected, and the skip-origin game scenario path data and the skip-destination block path data have no connectivity. Alternatively, when the player game value in the skip-origin game logic parameter does not meet the parameter judgment condition of Y, it is considered that the logic parameters are not interconnected.

In an embodiment, when the game logic parameter includes a plurality of game parameters (for example, a player game parameter and parameter judgment information), the server may respectively compare game parameters in the skip-origin game logic parameter with corresponding game parameters in the target game logic parameter; and whether the skip-origin game logic parameter and the target game logic parameter have connectivity in game logic is determined based on a comparison result, it is determined that the scenario path data has connectivity when the parameters have connectivity, and it is determined that the scenario path data has no connectivity when the parameters have no connectivity.

For example, when a comparison result of each player game parameter is comparison normality, the server determines that the parameters have connectivity; and when a comparison result is comparison abnormality, the server determines that the parameters have no connectivity.

Parameter comparison normality and abnormality may be set according to actual requirements. For example, a player game parameter a1 of a type in the skip-origin game logic parameter is compared with a player game parameter a2 of the same type in the target game logic parameter. When a parameter value difference between the player game parameter a1 and the player game parameter a2 meets a specific condition, it may be considered that comparison between the player game parameter a1 and the player game parameter a2 is normal; otherwise, comparison is abnormal. That is, if a difference between the same type of player parameter values meets a specific preset difference condition, it is determined that comparison is normal; otherwise, comparison is abnormal.

In another example, game parameter judgment information b1 in the current game logic parameter is compared with game parameter judgment information b2 in the target game logic parameter. When judgment logic between b1 and b2 meets a preset logic condition, for example, a judgment of b2 is inevitably passed if a judgment of b1 is passed, it may be considered that comparison between b1 and b2 is normal; otherwise, comparison is abnormal.

In an embodiment, when the target game logic parameter includes a parameter judgment condition corresponding to the player game parameter, during logic parameter comparison, the server may compare the player game parameter in the skip-origin game logic parameter with the parameter judgment in the target game logic parameter. When the player game parameter meets the parameter judgment condition, it may be determined that the comparison is normal; otherwise, it is determined that the comparison is abnormal.

For example, specifically, the skip-origin game logic parameter may include a player game parameter corresponding to the player when reaching the skip-origin block, and the target game logic parameter includes a parameter judgment corresponding to the player game parameter. In this case, the step of "comparing the skip-origin game logic parameter with the target game logic parameter" may include: comparing the player game parameter with the parameter judgment, to determine whether the player game parameter meets the parameter judgment condition.

When determining that the player game parameter meets the parameter judgment condition, it is determined that the comparison is normal, and when determining that the player game parameter does not meet the parameter judgment condition, it is determined that the comparison is abnormal.

During actual application, when the skip-origin block is located on the target game scenario path, it indicates that the skip-origin block and the skip-destination block are on the same path. The skip-origin block and the skip-destination block usually store the same type of player game parameters, for example, both store a first player game parameter X and a second player game parameter Y. Therefore, when the server performs parameter comparison, if the server determines that parameter judgments of the player game parameters of the skip-destination block are not stored, a comparison result of each player game parameter is normal. If the parameter judgments of the player game parameters of the skip-destination block are stored, only the player game parameters of the skip-origin block may need to be compared with parameter judgments of the skip-destination block, to determine whether the player game parameters meet the parameter judgments (for example, determine whether a game parameter X in the start scenario block meets a judgment X in the target scenario block). If meeting, the comparison is normal; otherwise, the comparison is abnormal.

For example, if the skip-origin game logic parameter includes only a player game parameter a, and the target game logic parameter includes the player game parameter a and a judgment b of the player game parameter a, the player game parameter a in the skip-origin game logic parameter may be compared with the parameter judgment b in the target game logic parameter. If the player game parameter a meets the parameter judgment b, it is considered that the comparison is normal. If the player game parameter a does not meet the parameter judgment b, the comparison fails. In this case, it is determined that the parameter comparison is abnormal.

Through the foregoing introduced manner, in one embodiment of the present disclosure, whether the skip-origin game scenario path data stored in the skip-origin block and the target game scenario path data have connectivity in game logic may be determined, thereby determining which scenario skipping manner is used.

105. Update the target game scenario path data according to the skip-origin game scenario path data.

When the server determines that the skip-origin block is located on the target game scenario path and the skip-origin game scenario path data and the target game scenario path data have connectivity in game logic, to improve player experience, in one embodiment of the present disclosure, an effect of the current game path data on game path data of the target game scenario, that is, a chain effect generated by the path data of the current game scenario block on the path data of the skip-destination block needs to be considered, thereby changing subsequent scenario development after the player enters the target game scenario.

Therefore, to consider the chain effect, in one embodiment of the present disclosure, the target game scenario path data may be updated or adjusted based on the skip-origin game path data, so that the path data of the skip-destination block is affected, thereby changing subsequent scenario development after the player enters the target game scenario.

For example, the skip-origin block is the current game scenario block, and the game scenario path data includes the player game value Y. Assuming that a historical player game value Y=0 when the player enters the target game scenario corresponding to the skip-destination block at a previous historical time point, the skip-destination block may store current game scenario path data at the historical time point, to obtain the target game path data in one embodiment of the present disclosure. In this case, in the target game scenario path data, the player game value Y=0 (that is, the target player game value Y=0). After the target game scenario is completed, the server performs a judgment on the game value Y, for example, judges whether Y meets Y≤2. Since Y=0 in this case, the server judges that Y≤2, and then the server triggers to enter a first game scenario corresponding to Y≤2.

If the chain effect on the target player game value is not considered, after the player skips to enter the target game scenario, the server performs a judgment on the game value Y, for example, judges whether Y meets Y≤2. Since Y=0 in this case, the server judges that Y≤2, and then the server triggers to enter a first game scenario corresponding to Y≤2. The player still repeats the same game scenario, and the game scenario development is not changed. This is equivalent to performing a simple archive reading operation on archive information of the skip-destination block.

If the method in one embodiment of the present disclosure is used for skipping to the target game scenario, that is, the chain effect on the target game path data is considered, assuming that the current player game value Y=3 in the current game scenario path data, an effect generated by the current player game value (Y=3) on the target player game value Y in the target game scenario path needs to be considered. In this case, the target player game value Y may be updated based on the current player game value (Y=3). If the target player game value Y is updated to a value equal to 3, after the player enters the target game scenario, the server performs a judgment on the game value Y, for example, judges whether Y meets Y≤2. Since Y=3 in this case, the server judges that Y>2, and then the server triggers to enter a second game scenario corresponding to Y>2. In this case, the player enters the second game scenario different from the first game scenario. In this case, game scenario development of the player is changed.

Specifically, there may be a plurality of manners of updating the target game scenario path data. For example, in an embodiment, the target game scenario path data may be directly replaced with the skip-origin game scenario path data.

In another example, in an embodiment, the skip-origin game scenario path data may be processed based on a preset rule, and the target game scenario path data is replaced with processed game scenario path data.

In another example, in an embodiment, new game scenario path data on reaching the skip-destination block may be further constructed according to the skip-origin game scenario path data and the target game scenario path data; and the target game scenario path data is updated according to the new game scenario path data.

In an embodiment, if the game scenario path data includes a game path and a game logic parameter, the update on both the path and the logic parameter needs to be considered for the update on the path data. For example, the skip-origin game scenario path data includes a skip-origin game scenario path and a skip-origin game logic parameter; and the target game scenario path data includes a target game scenario path and a target game logic parameter.

Specifically, the step of "constructing new game scenario path data on reaching the skip-destination block according to the skip-origin game scenario path data and the target game scenario path data" may include:

constructing, according to the skip-origin game scenario path and the target game scenario path, a new game scenario path of reaching the skip-destination block from the skip-origin block; and inheriting the skip-origin game logic parameter based on the target game logic parameter, to obtain a new game logic parameter.

Specifically, a manner of constructing a new game scenario path may include: adding, based on the skip-origin game scenario path, a partial path of the target game scenario path from the skip-origin block to the skip-destination block. For example, the skip-origin game scenario path is L1, the target game scenario path is L2, and a local path of the target game scenario path L2 from the skip-origin block to the skip-destination block is L21. In this case, L1 and L21 may be connected together to form a new game scenario path L3=L1+L21.

For example, the skip-origin block is the current game scenario block. Referring to FIG. 1C, assuming that the current game scenario block is a game scenario block 2, the skip-destination block is a scenario block n, a game scenario path L1 stored in a node corresponding to the game scenario block 2 is: start scenario block=> . . . =>scenario block 1=>scenario block 2, a game value Y=3, and a game path L2 stored in the skip-destination block is: start scenario block=> . . . =>scenario block 2=> . . . =>scenario block n, a new game scenario path L3=start scenario block=> . . . =>scenario block 1=>scenario block 2=> . . . =>scenario block n of reaching the target game scenario 5 may be constructed according to L1 and L2.

In one embodiment of the present disclosure, the game logic parameter may be updated in a value inheritance manner; and specifically, the skip-origin game logic parameter may be inherited based on the target game logic parameter, to obtain a new game logic parameter. In one embodiment of the present disclosure, there may be a plurality of manners of inheriting a logic parameter, and the manners are as follows:

For example, when the game logic parameter has an accumulation characteristic (for example, the server judges an accumulated game logic parameter when judging the game logic parameter), a parameter value of the skip-origin game logic parameter may be added to a parameter value of the target game logic parameter.

For example, when the skip-origin game logic parameter includes the start player game value Y=y1, and the target game logic parameter includes the target player game value Y=y2, the target player game value may inherit the start player game value Y=y1 during logic parameter update. In this case, the target player game value Y=y1+y2.

In another example, in an embodiment, the skip-origin block is the current game scenario block, and when the game logic parameter has no accumulation characteristic (for example, the server judges a currently generated game logic parameter when judging the game logic parameter), the target game logic parameter may be directly replaced with the current game logic parameter. For example, when the current game logic parameter includes the current player game value X=x1, and the target game logic parameter includes the target player game value X=x2, the target player game value X=x1 during logic parameter update.

In one embodiment of the present disclosure, the target game scenario path data may be updated according to the foregoing introduced data update manner, to achieve a chain effect of scenario block data, thereby changing subsequent scenario development.

106. Enter a game scenario corresponding to the skip-destination block according to updated target game scenario path data.

After the target game scenario path data is updated, the scenario corresponding to the skip-destination block may be entered based on the game scenario path and the game logic parameter in the path data. In this case, the scenario of the skip-destination block may be the same as or different from a scenario of the skip-destination block at a historical time point.

For example, in an embodiment, if a scenario of a scenario block in the game is related to game path data, for example, different path data triggers different scenarios, because the target game scenario path data is changed after being updated, the game scenario of the skip-destination block is changed. In this case, a game scenario to be entered is different from a scenario at a historical time point.

In another example, in an embodiment, if a game scenario corresponding to a game scenario block is fixed, a game scenario, of the skip-destination block, still to be entered after path data of the game scenario block is updated and changed is the same as that at a historical time point. In this case, updated game scenario path data affects some attribute and the like of the role of the player.

107. Enter a game scenario corresponding to the skip-destination block according to the target game scenario path data.

When the skip-origin block is located on the target game scenario path, and the skip-origin game scenario path data and the target game scenario path data have no connectivity in game logic, in one embodiment of the present disclosure, the terminal may perform a game scenario corresponding to the scenario block directly based on the game path data of the skip-destination block, that is, implement scenario skipping in a direct scenario skipping manner. In an embodiment, this is equivalent to that the terminal directly performs an archive reading operation on the game archive information of the skip-destination block, to reenter the game scenario corresponding to the scenario block. The player may reenter the scenario of the skip-destination block to start to replay the game. A game scenario block is entered to, for example, start to play a video corresponding to the game scenario block.

For example, skipping from the scenario block 2 backward (in a direction toward the end) to the scenario block 5, that is, scenario time-travel is performed. In this case, the scenario block 2 is the current game scenario block (that is, the skip-origin block), and the scenario block 5 is the skip-destination block; and after game scenario path data of the scenario block 5 and the scenario block 2 is read, it may be determined in the foregoing introduced manner that the scenario block 2 is on the game scenario path stored in the scenario block 5, but the path data of the scenario block 5 and the path data of the scenario block 2 have no connectivity. In this case, the game scenario path of the scenario block 5 may be reentered directly based on the game scenario path data stored in the scenario block 5, to skip to the game scenario of the scenario block 5. This is equivalent to that, an archive reading operation is performed on the game archive information stored in the scenario block 5, to start to trace or re-play the game from the scenario of the scenario block 5.

In an embodiment, when the skip-origin block is located on the target game scenario path, a game scenario corresponding to the skip-destination block is entered according to the target game scenario path data.

For example, skipping from the scenario block 5 backward to the scenario block 2, that is, scenario back-skipping is performed. In this case, the scenario block 5 is the current game scenario block (that is, the skip-origin block), and the scenario block 2 is the skip-destination block; and after game scenario path data of the scenario block 5 and the scenario block 2 is read, it may be determined in the foregoing introduced manner that the scenario block 5 is not on the game scenario path stored in the scenario block 2. In this case, the game scenario path of the scenario block 2 may be reentered directly based on the game scenario path data stored in the scenario block 5, to skip to the game scenario of the scenario block 2. This is equivalent to that, an archive reading operation is performed on the game archive information stored in the scenario block 2, to start to trace or re-play the game from the scenario of the scenario block 2.

According to the foregoing description, the interactive scenario implementation method provided in one embodiment of the present disclosure is described below by using an example:

For example, the skip-origin block is the current game scenario block, and the game scenario path data includes the player game value Y. Assuming that the historical player game value Y=0 when the player enters a game scenario corresponding to the game scenario block 5 through the game scenario path: scenario blocks 1, 2, 3, and 4 at a previous historical time point, the server may store the current game scenario path data of the game scenario block 5 at the historical time point, to obtain the stored game path data (Y=0) in the scenario block 5. In this case, in the stored game scenario path data of the scenario block 5, the player game value Y=0. After the game scenario of the scenario block 5 is completed, the server performs a judgment on the game value Y, for example, judges whether Y meets Y≤2. Since Y=0 in this case, the server judges that Y≤2, and then the terminal triggers to enter a game scenario corresponding to Y≤2, such as a death ending scenario, that is, a game finish scenario.

After entering the game finish scenario, the player realizes that the game finish may be caused by a reason that a previous game operation (for example, a scenario development selection operation) after the scenario block 2 has a problem, and the player may click/tap the scenario block 2 in the game story line interface to trigger the scenario skipping instruction. In this case, the scenario block 2 is the skip-destination block, and the game finish scenario block is the current game scenario block. According to the method in one embodiment of the present disclosure, the terminal may first determine whether the scenario block 5 is located on the game scenario path of the scenario block 2. Because the scenario block 5 is after the scenario block 2, it is very evident that the scenario block 5 is not located on the game scenario path of the scenario block 2. Then, the terminal reenters the game scenario of the scenario block 2 directly based on the game scenario path data of the scenario block 2. After the terminal enters the game scenario of the scenario block 2, the player may enter a scenario (for example, a scenario development selection interactive scenario) of a parameter game scenario block after the scenario block 2, and the player may perform a game operation (for example, a scenario development selection operation) different from a previous game operation again in the scenario of the parameter game scenario block, to cause the player game value to be different from the previous player game value (for example, cause the player game value to be Y=2). In this way, a case that the game is over to enter another scenario may be avoided when the server performs a judgment.

Figure 2B:
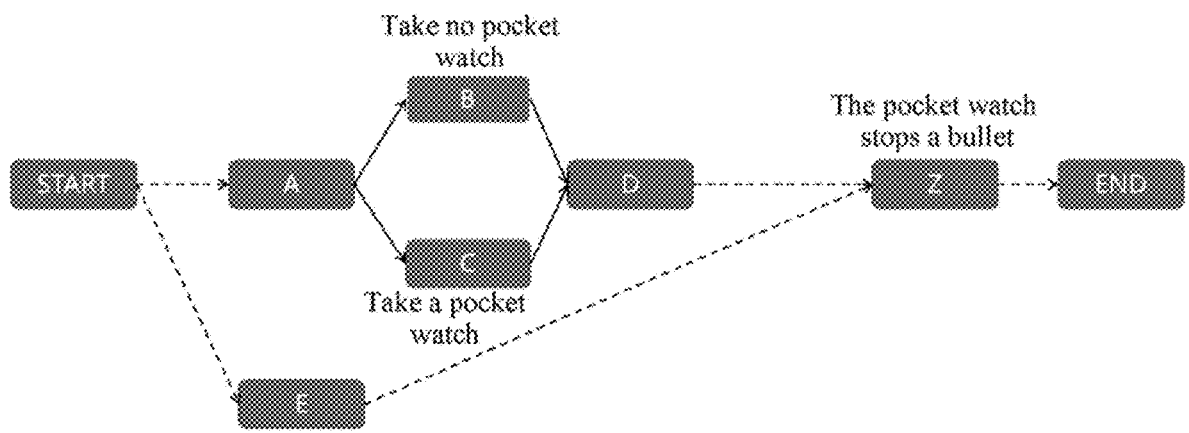
FIG. 2B is a schematic diagram of another game scenario route represented by using nodes according to an embodiment of the present disclosure.

For example, the foregoing pocket watch stops a bullet (FIG. 2A and FIG. 2B). In the foregoing case that the player chooses, after entering the scenario block A, to enter scenario block B without taking the pocket watch, the game finish scenario is entered when a subsequent scenario block in which the pocket watch stops a bullet is entered. By using the method in one embodiment of the present disclosure, after entering the scenario block A, the player chooses, after performing an operation again, to enter the scenario block C with the pocket watch, so that the prop parameter is changed. In this way, when the scenario block in which the pocket watch stops a bullet is subsequently entered, the role of the player may survive to develop a subsequent scenario.

After the player re-plays the game from the scenario block 2 and changes the operation, the player may sequentially repeat an skip-original intermediate scenario block between the scenario blocks 2 and 5 to the scenario block 5 according to the skip-original path from the scenario block 2 to the scenario block 5 (scenario block 3=>scenario block 4 . . . =>scenario block 5) (for the player, this is equivalent to reentering an intermediate scenario block such as the scenario block 3 or 4 to perform a game scenario the same as that at a historical time point, that is, re-play the scenario of the intermediate scenario block once). When the player enters game scenario corresponding to the game scenario block 5, the player game value is changed from previous Y=0 to current Y=2, the server may store the current game scenario path data of the game scenario block 5, to obtain the stored game path data in the scenario block 5. In this case, in the game scenario path data stored in the scenario block 5, the player game value Y=2. After the game scenario of the scenario block 5 is completed, the server performs a judgment on the game value Y, (for example, judges whether Y meets Y≤2 or Y>2). Since Y=2 in this case, the server judges that Y=2, and then the server triggers to enter a game scenario corresponding to Y=2, such as a game non-finish scenario.

In an embodiment, to prevent the player from re-playing an intermediate scenario block between the scenario block 2 and the scenario block 5, the method in one embodiment of the present disclosure is used, and skipping to the scenario of the scenario block 5 may be further implemented without repeating an intermediate scenario. For example, when entering the scenario of the scenario block 3, the player may further perform a scenario skipping operation. For example, the player may trigger to display the game story line interface and click/tap the scenario block 5 to trigger a scenario skipping instruction. In this case, the scenario block 5 is the skip-destination block, and the scenario block 3 is the current game scenario block. When the terminal determines that the scenario block 3 is located on the game scenario path of the scenario block 5, and game scenario path data stored in the scenario block 3 and the scenario block 5 is interconnected in game logic (for example, in the foregoing introduced data interconnection manner), the terminal updates, based on the game scenario path data stored in the scenario block 3, the game scenario path data stored in the scenario block 5. For example, assuming that the player game value stored in the scenario block 3 is Y=2, the player game value stored in the scenario block 5 may be updated to Y=2. After the game scenario of the scenario block 5 is completed, the server performs a judgment on the game value Y, (for example, judges whether Y meets Y≤2 or Y>2). Since Y=2 in this case, the server judges that Y=2, and then the server triggers to enter a game scenario corresponding to Y=2, such as a game non-finish scenario.

In one embodiment of the present disclosure, there may be a plurality of types of game scenarios such as a spy type game scenario and a love type game scenario.

It can be known from above that, in one embodiment of the present disclosure, a readable game scenario block is used for automatically storing game path data, scenario logic may be automatically stored and be presented through a scenario structure interface, so that the player does not have memory confusion because of seeing only an archive location, and does not need to always worry about whether the player has archived the file, causing scenario experience interruption.

Moreover, the method may further implement game scenario skipping, and may effectively reduce re-playing costs of the player, to enable the player to patiently explore the entire game, thereby greatly improving game experience and interactivity of the player.

An embodiment of the present disclosure further provides an interactive scenario implementation method, performed by a computer device. The computer device is, for example, a server. The method includes the following steps: receiving a scenario skipping instruction transmitted by a terminal; determining, according to the scenario skipping instruction, a skip-origin block and a skip-destination block that needs to be skipped to, the skip-destination block correspondingly storing target game scenario path data including a target game scenario path; updating, when determining that the skip-origin block is located on the target game scenario path and determining that skip-origin game scenario path data stored in the skip-origin block and the target game scenario path data have connectivity in game logic, the target game scenario path data according to the skip-origin game scenario path data; and delivering updated target game scenario path data to the terminal, the updated target game scenario path data causing the terminal to enter a game scenario corresponding to the skip-destination block.

An embodiment of the present disclosure further provides an interactive scenario implementation method, performed by a computer device. The computer device is, for example, a terminal. The method includes the following steps: displaying a game scenario structure interface, the game scenario structure interface including several readable game scenario blocks that a player has played, each game scenario block corresponding to one or more game scenarios, and each readable game scenario block correspondingly storing game scenario path data; receiving a scenario skipping instruction triggered by the player through the game scenario structure interface, and transmitting the scenario skipping instruction to a server; receiving, from the server, target game scenario path data updated according to skip-origin game scenario path data, a skip-origin block being located on a target game scenario path, and skip-origin game scenario path data stored in the skip-origin block and the target game scenario path data having connectivity in game logic; and entering a game scenario corresponding to the skip-destination block according to updated target game scenario path data.

For specific implementation of the steps, reference may be made to detailed description of the same or similar steps in FIG. 1B.

According to the method described in the foregoing embodiments, the following further provides detailed description.

In one embodiment, by using an example in which an interactive scenario implementation apparatus is integrated in the terminal, the method in this embodiment of the present disclosure is described in detail.

Figure 3A:
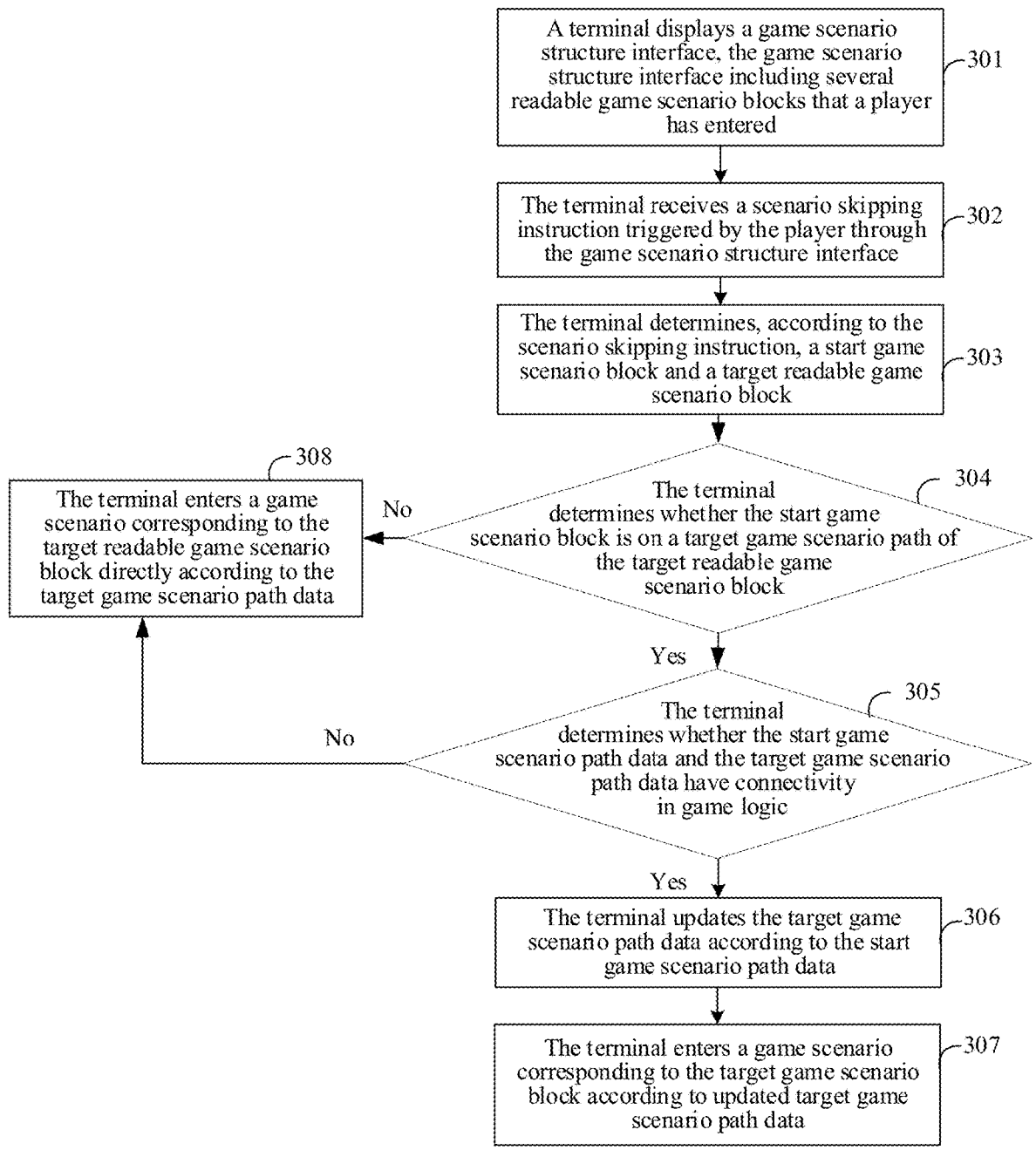
FIG. 3A is a schematic flowchart of an interactive scenario implementation method according to an embodiment of the present disclosure.

As shown in FIG. 3A, a specific process of an interactive scenario implementation method is as follows:

301. A terminal displays a game scenario structure interface, the game scenario structure interface including several readable game scenario blocks that a player has played.

In one embodiment of the present disclosure, a readable game scenario block may be a game scenario block whose path data is stored. A readable game scenario block may be considered as a data storage node, and therefore, the terminal may store data of each readable game scenario block, such as game scenario path data. The game scenario path data may include a game scenario path (which may include scenario block information on a path, that is, node information such as a node identifier), game archive information (for example, game archive time information), and a game logic parameter.

Moreover, the game scenario structure interface may further include other types of game scenario blocks such as a game parameter scenario block and a game logic judgment block, and the game parameter scenario block may be a scenario block storing only a game storage parameter, such as, a value game scenario block (a scenario block storing only a game value). The game logic judgment block may be a unit for performing a game logic judgment, such as, a game parameter value judgment block.

For details of the introduction of the game scenario structure interface, reference may be made to the description in the foregoing embodiment.

Figure 3B:
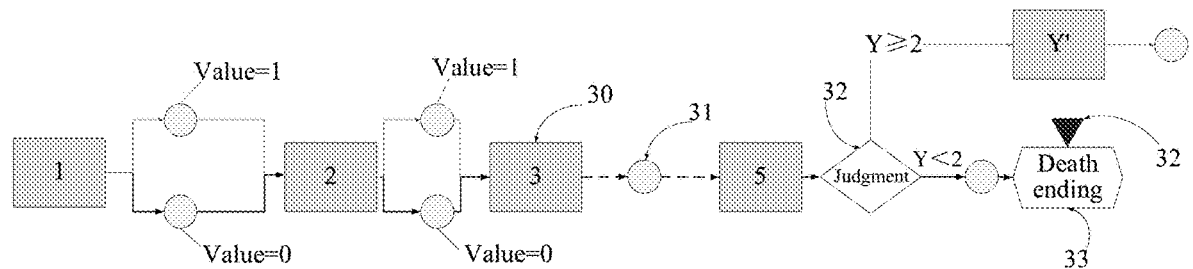
FIG. 3B is a schematic diagram of a game scenario structure according to an embodiment of the present disclosure.

For example, refer to FIG. 3B, which is a schematic diagram of a game scenario structure in which a player enters a death ending. The game scenario structure may correspond to a scenario block displayed in a game scenario structure interface, and includes: a readable game scenario block 30, a value scenario block 31 (storing only a value), a value judgment block 32, a current location identifier 33 of the player, a death ending scenario block 34, a current scenario path (represented by a black connecting line) of the player, and the like.

As shown in FIG. 3B, in a game, the player forms, through an interaction operation, a scenario path shown in FIG. 3B. When the player reaches the value judgment block according to the scenario path, because a game value Y<2, the value judgment block triggers, after performing a value judgment, to enter the death ending scenario block.

When the player enters the death ending scenario, the player may realize that the death ending is entered due to a reason that a previous game operation (for example, a scenario development selection operation) after a game scenario block 1 has a problem; and each player usually intends to again perform the previous game operation. In this case, the player may trigger a game scenario structure display instruction through a game scenario interface. For example, the player may trigger the game scenario structure display instruction through a game scenario structure display entry provided by the game scenario interface. For example, the player may click/tap a game scenario structure display button on the game scenario interface to trigger the game scenario structure display instruction. In this case, the terminal displays the game scenario structure interface according to the instruction.

Figure 3C:
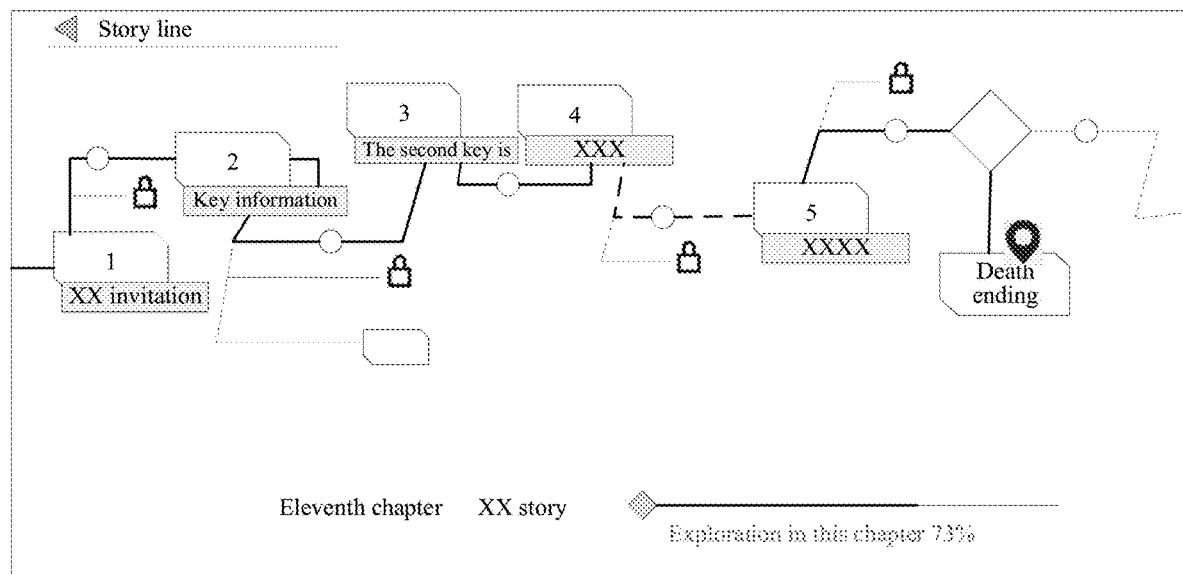
FIG. 3C is a schematic diagram of another game story line interface according to an embodiment of the present disclosure.

The game scenario structure interface may display a corresponding scenario structure shown in FIG. 3C. For example, refer to FIG. 3C.

302. The terminal receives a scenario skipping instruction triggered by the player through the game scenario structure interface.

For example, after the terminal displays the game scenario structure interface shown in FIG. 3C, the player may click/tap a readable game scenario block 1 in the interface to trigger the scenario skipping instruction. In this case, the terminal receives the instruction. The instruction indicates that a target readable game scenario that needs to be entered is the scenario block 1.

303. The terminal determines, according to the scenario skipping instruction, a skip-origin block and a skip-destination block.

The skip-origin block is a start-point scenario block of scenario skipping, such as, a current game scenario block.

The skip-destination block is the readable game scenario block that needs to be skipped to.

There may be a plurality of manners of determining the skip-origin block. For example, the current game scenario block may be determined as the skip-origin block. In another example, when a game scenario block entered by the player at a current time point is a readable game scenario block, the game scenario block may be determined as the current game scenario block. In another example, in an embodiment, when a game scenario block entered by the player at a current time point is an unreadable game scenario block such as a game finish scenario block, a game parameter scenario block, or an interaction operation scenario block, a historical readable game scenario block temporally closest to the game scenario block time may be determined as the skip-origin block. For example, if the player performs scenario skipping when entering the game finish scenario block, it may be determined that a previous readable game scenario block of the game finish scenario block is the current game scenario block.

As shown in FIG. 3B and FIG. 3C, it may be determined that the skip-origin block is the death ending scenario block, and the skip-destination block is the game scenario block 1.

The current readable game scenario block stores game scenario path data, and the game scenario path data may include a game scenario path and a game logic parameter. In an embodiment, the game scenario path data is equivalent to game archive information.

The game scenario path data may include a game scenario path (which may include scenario block information on a path, that is, node information such as a node identifier), game archive information (for example, game archive time information), and a game logic parameter.

A game scenario path is a scenario route experienced by the player entering a game scenario corresponding to the game scenario block. The game logic parameter may include a game parameter corresponding to the player when reaching the game scenario corresponding to the game scenario block, for example, a game parameter value such as a prop parameter or a preference value. A game scenario path is a scenario route experienced by the player entering a game scenario corresponding to the game scenario block. The game logic parameter may include a game parameter corresponding to the player when reaching the game scenario corresponding to the game scenario block, for example, a game parameter value such as a prop parameter or a preference value.

304. The terminal determines whether the skip-origin block is on a target game scenario path of the skip-destination block. If yes, step 305 is performed, or if not, step 308 is performed.

There are a plurality of manners of determining whether the skip-origin block is on the target game scenario path. Reference may be made to the introduction in the foregoing embodiment.

Figure 3D:
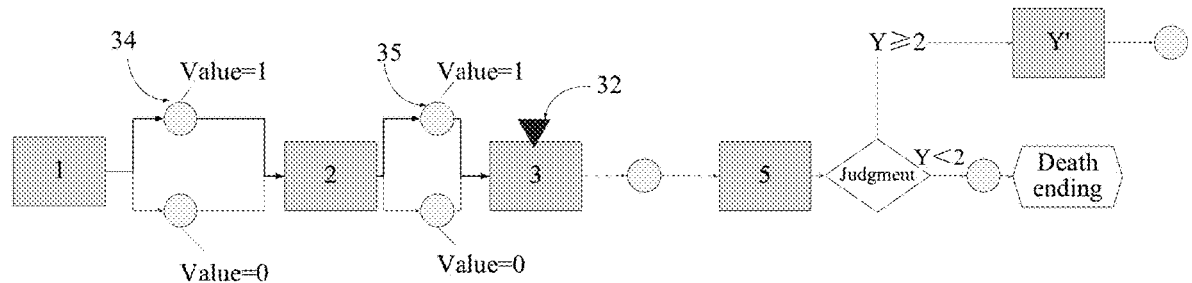
FIG. 3D is a schematic diagram of game scenario skipping according to an embodiment of the present disclosure.

For example, referring to FIG. 3B and FIG. 3C, based on the manner introduced in one embodiment of the present disclosure, it may be determined that the death ending game block is not on the game scenario path stored in the game scenario block 1. Specifically, the game path of the game scenario block 1 is: start scenario block=> . . . =>scenario block 1. It is very evident that the death ending scenario block is not on the game path. In this case, step 308 is performed, and the terminal may directly read the path data stored in the scenario block 1 to enter the game scenario of the scenario block 1, which is equivalent to performing archive reading on the game archive data stored in the scenario block 1, reentering the game scenario of the scenario block 1, and implementing scenario tracing. After performing back-skipping from the death ending scenario block to enter the scenario block 1 (back-skipping from the death ending scenario block to the scenario block 1 may be performed by using the foregoing introduced method), the player may again perform a game operation such as a scenario development selection operation, to modify the game value Y. For example, referring to FIG. 3D, when entering a scenario after the game scenario block 1, the player may reenter a scenario of a value scenario block 34 after the readable scenario block 1, and a scenario of a value scenario block 35 after a readable scenario block 2, to perform a game interaction operation in which a game value is equal to 1, and then the player may enter a game scenario of a readable scenario block 3. In this case, the readable scenario block 3 may store the current path data, where the game value Y=2. Game path L3=start scenario block=> . . . =>scenario block 1=>scenario block 2=>scenario block 3.

In another example, in another scenario, the player performs back-skipping from the death ending scenario block to enter the scenario block 1 (back-skipping from the death ending scenario block to the scenario block 1 may be performed by using the foregoing introduced method), and reaches the game scenario block 3 after again performing the game operation. After the player re-plays the game from the scenario block 1 and changes the operation, the player may sequentially repeat an skip-original intermediate scenario block between the scenario blocks 2 and 5 to the scenario block 5 according to the skip-original path from the scenario block 1 to the scenario block 5 (scenario block 3=>scenario block 4 . . . =>scenario block 5).

For the player, this is equivalent to reentering an intermediate scenario block such as the scenario block 3 or 4 to perform a game scenario the same as that at a historical time point, that is, re-play the scenario of the intermediate scenario block once. The experience of the player is quite poor, but through the method provided in one embodiment of the present disclosure, the player may trigger a game scenario structure display instruction through a game scenario interface. For example, the player may trigger the game scenario structure display instruction through a game scenario structure display entry provided by the game scenario interface. For example, the player may click/tap a game scenario structure display button on the game scenario interface to trigger the game scenario structure display instruction. In this case, the terminal performs step 301 to display the game scenario structure interface according to the instruction, referring to FIG. 3E.

Figure 3E:
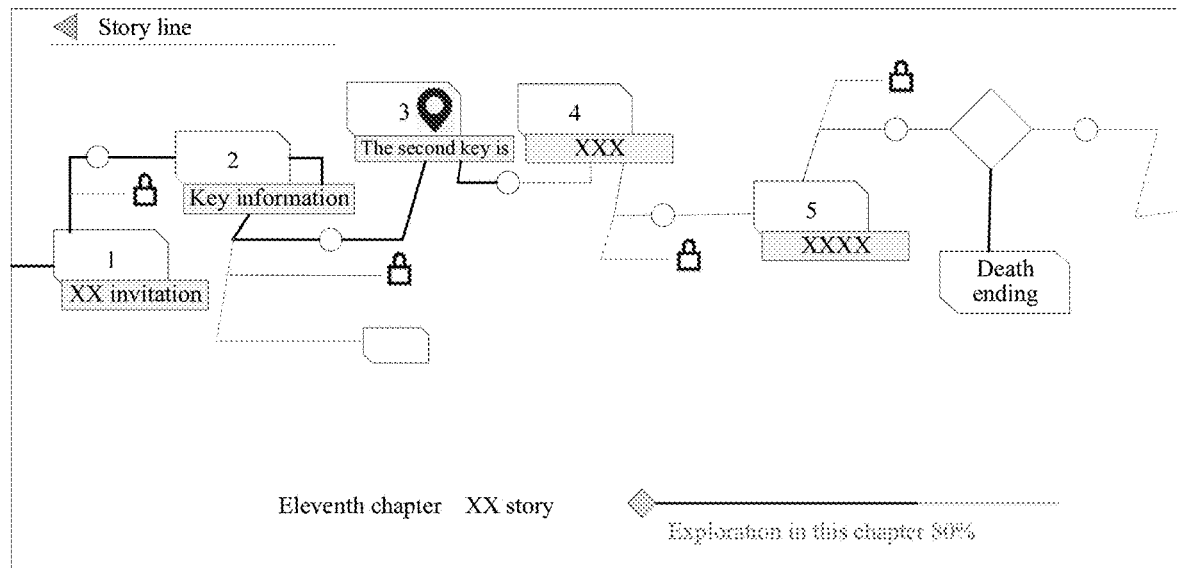
FIG. 3E is a schematic diagram of another game story line interface according to an embodiment of the present disclosure.

After the terminal displays the game scenario structure interface shown in FIG. 3E, the player may click/tap a readable game scenario block 5 in the interface to trigger the scenario skipping instruction. In this case, the terminal receives the instruction. The terminal may again perform steps 302 and 303 to determine, according to the scenario skipping instruction, the skip-origin block (that is, the scenario block 3) and the skip-destination block (that is, the scenario block 5).

Then, the terminal performs step 304, to determine whether the scenario block 3 is located on the game path L5 of the scenario block 5: start scenario block=> . . . =>scenario block 1=>scenario block 2=>scenario block 3=> . . . =>scenario block 5. The scenario block 3 is located on L5. In this case, the terminal performs step 305, to determine whether the game scenario path data of the scenario block 3 and the game scenario path data of the scenario block 5 have connectivity in game logic.

305. The terminal determines whether the skip-origin game scenario path data and the target game scenario path data have connectivity in game logic. If yes, step 306 is performed, or if not, step 308 is performed.

The skip-origin game scenario path data may include a skip-origin game logic parameter, and the target game scenario path data may include a target game logic parameter. For example, the terminal compares the skip-origin game logic parameter with the target game logic parameter, to obtain a comparison result; determines, according to the comparison result, whether the skip-origin game logic parameter and the target game logic parameter are interconnected in game logic; determines, when being interconnected, that the skip-origin game scenario path data and the target game scenario path data have connectivity in game logic; and determines, when being not interconnected, that the skip-origin game scenario path data and the target game scenario path data have no connectivity in game logic.

In an embodiment, the skip-origin game logic parameter may include a player game parameter corresponding to the player when reaching the skip-origin block, and the target game logic parameter includes a parameter judgment corresponding to the player game parameter. The terminal may compare the player game parameter with the parameter judgment, to determine whether the player game parameter meets the parameter judgment; and when determining that the player game parameter meets the parameter judgment, it is determined that the comparison is normal, and when determining that the player game parameter does not meet the parameter judgment, it is determined that the comparison is abnormal.

Figure 3F:
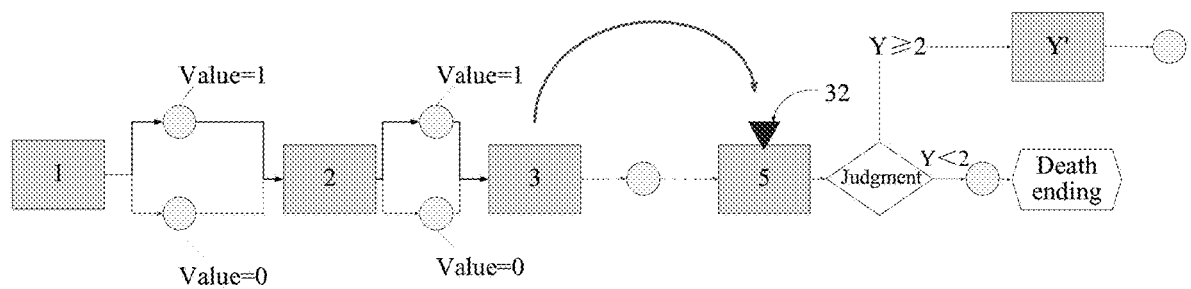
FIG. 3F is a schematic diagram of another type of game scenario skipping according to an embodiment of the present disclosure.

For example, referring to FIG. 3E and FIG. 3F, when the terminal performs step 304, to determine that the scenario block 3 is located on the game path L5 of the scenario block 5, the terminal may determine whether the path data stored in the scenario block 3 and the path data stored in the scenario block 5 have connectivity in game logic.

For example, the path data stored in the scenario block 3 may include: game value Y=2, and game path L3=start scenario block=> . . . =>scenario block 1=>scenario block 2=>scenario block 3.

The path data stored in the scenario block 5 includes: the game value Y=0, a judgment on the value Y (for example, Y>1), and the game path L5.

During comparison, the terminal may compare the game value Y=2 with a judgment on the value Y in the scenario block 5, to see whether to meet the judgment on Y. If meeting, it indicates that path data of the scenario blocks 3 and 5 has connectivity in logic. In this case, the terminal may perform step 306, to perform a chain effect on the path data of the target scenario block. Assuming that the judgment on Y is not met, it indicates that the path data of the scenario blocks 3 and 5 has no connectivity in logic. In this case, the terminal performs step 308 to enter the scenario of the scenario block 5 directly based on the path data of the scenario block 5.

306. The terminal updates the target game scenario path data according to the skip-origin game scenario path data.

There may be a plurality of manners of updating the target game scenario path data. Reference may be made to the introduction in the foregoing embodiment.

For example, referring to FIG. 3E and FIG. 3F, the game value in the scenario block 5 may be set to Y=2, that is, the game value in the scenario block 3 is inherited; and the path L5 of the scenario block 5 is updated to start scenario block=> . . . =>scenario block 1=>scenario block 2=>scenario block 3=> . . . =>scenario block 5.

307. The terminal enters a game scenario corresponding to the skip-destination block according to updated target game scenario path data.

For example, after updating the path data in the scenario block 5, the terminal may load and display the game scenario of the scenario block 5 based on updated path data.

Figure 3G:
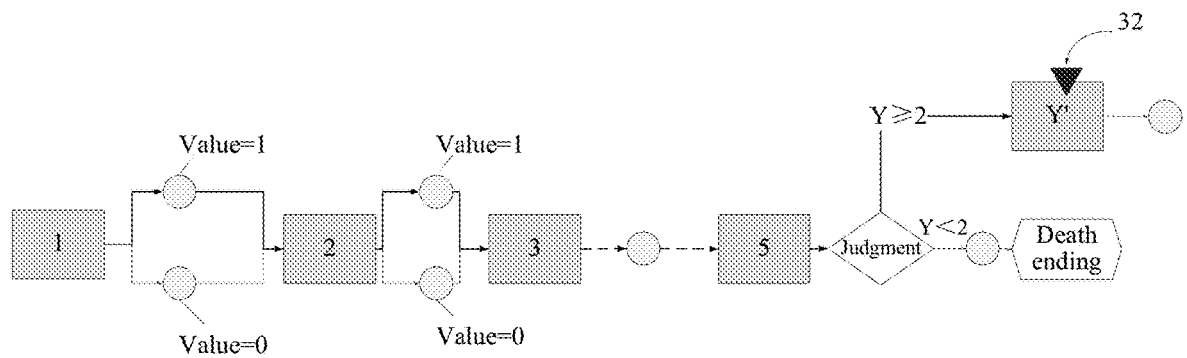
FIG. 3G is a schematic diagram of another type of game scenario skipping according to an embodiment of the present disclosure.

For example, referring to FIG. 3G, when the player enters game scenario corresponding to the game scenario block 5, the player game value is changed from previous Y=0 to current Y=2, the game scenario block 5 may store the current game scenario path data, to obtain the game path data stored in the scenario block 5. In this case, in the game scenario path data stored in the scenario block 5, the player game value Y=2. After the game scenario of the scenario block 5 is completed, the terminal performs a judgment on the game value Y (for example, judges whether Y meets Y≤2 or Y>2). Since Y=2 in this case, the terminal judges that Y=2, and then the terminal triggers to enter a game scenario Y' corresponding to Y>2, which is different from a death ending scenario, thereby changing game scenario development.

308. The terminal enters a game scenario corresponding to the skip-destination block directly according to the target game scenario path data.

When the skip-origin block is not located on the target game scenario path, or the skip-origin game scenario path data and the target game scenario path data have no connectivity in game logic, the terminal may directly read the game scenario path data of the target scenario block to reenter the target game scenario. This is equivalent to directly performing an archive reading operation on the game archive information stored in the skip-destination block, to reenter the game scenario corresponding to the scenario block. The player may reenter the scenario of the skip-destination block to start to replay the game. For example, in a scenario of skipping from the death ending scenario block to the scenario block 1, it is judged that the death ending scenario block is not located on the path of the scenario block 1. In this case, the terminal directly reads the path data stored in the scenario block 1, to enter the scenario block 1 based on the path data skip-originally stored in the scenario block 1; and this is equivalent to performing archive reading on the game archive data of the scenario block 1 to enter the scenario.

In another example, in a scenario of skipping from the scenario block 3 to the scenario block 5, if it is judged that the scenario block 3 is on the path of the scenario block 5, but the path data of the scenario blocks 3 and 5 has no connectivity. In this case, the terminal may directly read the path data stored in the scenario block 1, to enter the scenario block 5 based on the path data skip-originally stored in the scenario block 1; and this is equivalent to performing archive reading on the game archive data of the scenario block 5 to enter the scenario.

It can be known from above that, by using the interactive scenario implementation method provided in one embodiment of the present disclosure, the player may trace a scenario of any readable game scenario block in a direction toward the start point; and may further implement cross-scenario skipping in a direction toward the end point, thereby greatly improving game experience.

To better implement the foregoing method, an embodiment of the present disclosure further provides an interactive scenario implementation apparatus. The interactive scenario implementation apparatus may be specifically integrated in a terminal, for example, a device such as a mobile phone, a notebook computer, a tablet computer, or a mini-processing box.

Figure 4A:
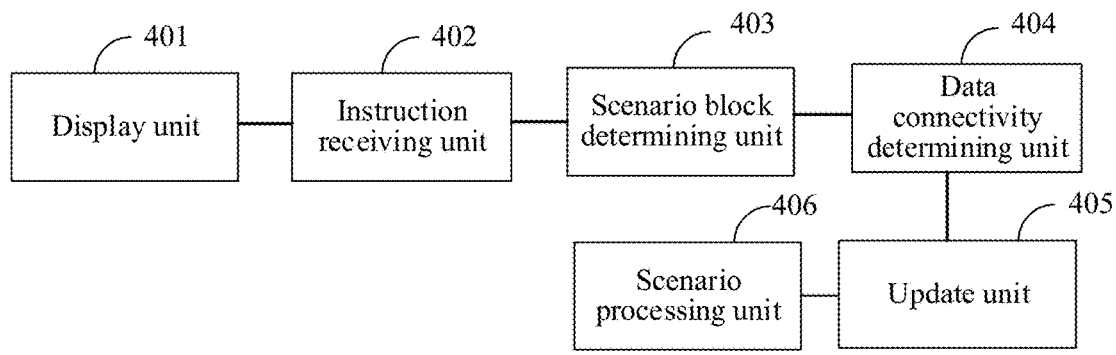
FIG. 4A is a first schematic structural diagram of an interactive scenario implementation apparatus according to an embodiment of the present disclosure.

For example, as shown in FIG. 4A, the interactive scenario implementation apparatus may include a display unit 401, an instruction receiving unit 402, a scenario block determining unit 403, a data connectivity determining unit 404, an update unit 405, and a scenario processing unit 405, which are as follows:

The display unit 401 is configured to display a game scenario structure interface, the game scenario structure interface including several readable game scenario blocks that a player has played, each game scenario block corresponding to one or more game scenarios, and each readable game scenario block storing game scenario path data;

the instruction receiving unit 402 is configured to receive a scenario skipping instruction triggered by the player through the game scenario structure interface;

the scenario block determining unit 403 is configured to determine, according to the scenario skipping instruction, a skip-origin block and a skip-destination block that needs to be skipped to, the skip-destination block storing target game scenario path data including a target game scenario path;

the data connectivity determining unit 404 is configured to determine, when the skip-origin block is located on the target game scenario path, whether skip-origin game scenario path data stored in the skip-origin block and the target game scenario path data have connectivity in game logic;

the update unit 405 is configured to update, when the data connectivity determining unit determines that the skip-origin game scenario path data and the target game scenario path data have connectivity in game logic, the target game scenario path data according to the skip-origin game scenario path data; and the scenario processing unit 406 is configured to enter a game scenario corresponding to the skip-destination block according to updated target game scenario path data.

Figure 4B:
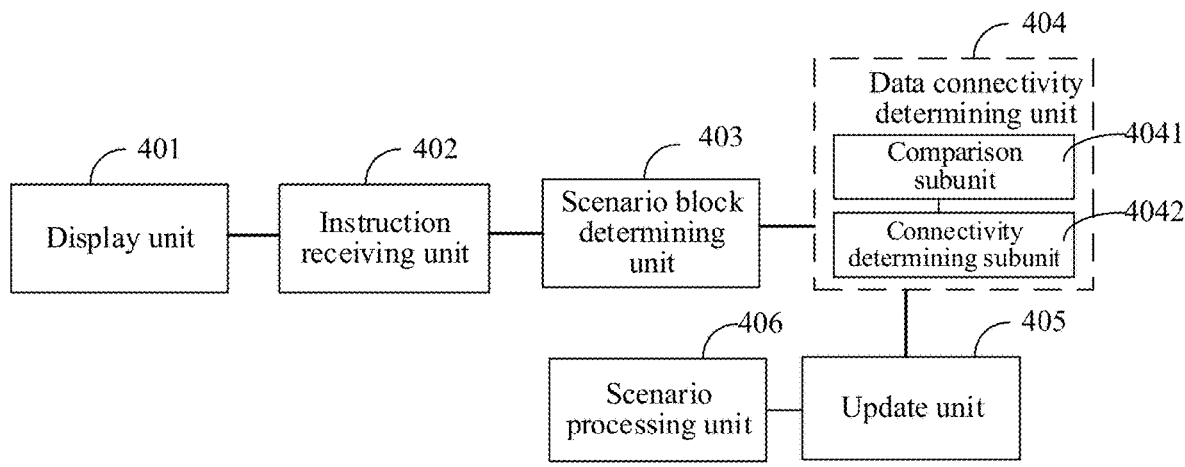
FIG. 4B is a second schematic structural diagram of an interactive scenario implementation apparatus according to an embodiment of the present disclosure.

In an embodiment, the skip-origin game scenario path data includes a skip-origin game logic parameter; and the target game scenario path data further includes a target game logic parameter. Referring to FIG. 4B, the data connectivity determining unit 404 may include:

a comparison subunit 4041, configured to compare the skip-origin game logic parameter with the target game logic parameter, to obtain a comparison result; and a connectivity determining subunit 4042, configured to determine, according to the comparison result, whether the skip-origin game logic parameter and the target game logic parameter are interconnected in game logic, and determine, when being interconnected, that the skip-origin game scenario path data and the target game scenario path data have connectivity in game logic.

In an embodiment, the skip-origin game logic parameter includes a player game parameter corresponding to the player when reaching the skip-origin block, and the target game logic parameter includes a parameter judgment corresponding to the player game parameter; and the comparison subunit 4041 may be specifically configured to:

compare the player game parameter with the parameter judgment, to determine whether the player game parameter meets the parameter judgment.

In an embodiment, the data connectivity determining unit 404 may be specifically configured to: find an intersection of the target game scenario path and a skip-origin game scenario path, to obtain an intersection block;

determine, when the intersection block is the skip-origin block, that the skip-origin block is located on the target game scenario path; and determine whether the skip-origin game scenario path data stored in the skip-origin block and the target game scenario path data have connectivity in game logic.

In an embodiment, the update unit 405 may be specifically configured to: construct, according to the skip-origin game scenario path data and the target game scenario path data, new game scenario path data on reaching the skip-destination block; and update the target game scenario path data according to the new game scenario path data.

In an embodiment, the skip-origin game scenario path data includes a skip-origin game scenario path and a skip-origin game logic parameter; and the target game scenario path data further includes a target game logic parameter. The update unit 405 may be configured to:

construct, according to the skip-origin game scenario path and the target game scenario path, a new game scenario path of reaching the skip-destination block;

inherit the skip-origin game logic parameter based on the target game logic parameter, to obtain a new game logic parameter; and update the target game scenario path according to the new game scenario path, and update the target game logic parameter according to the new game logic parameter.

In an embodiment, the scenario processing unit 406 may be further configured to: enter, when the skip-origin block is located on the target game scenario path, a game scenario corresponding to the skip-destination block according to the target game scenario path data.

In an embodiment, the scenario processing unit 406 may be further configured to: enter, when determining that skip-origin game scenario path data and the target game scenario path data have no connectivity in game logic, a game scenario corresponding to the skip-destination block according to the target game scenario path data.

In an embodiment, the display unit 401 may be specifically configured to:

receive a scenario structure display instruction triggered by the player through a game interface; and return to display the game scenario structure interface according to the scenario structure display instruction.

In an embodiment, the display unit 401 may be specifically configured to:

read a current game scenario path when receiving a scenario structure display instruction, and read, from a readable game scenario block, a historical game scenario path corresponding to the player when reaching the readable game scenario block;

draw the current game scenario path and the historical game scenario path in the game scenario structure interface; and display the game scenario structure interface after the drawing.

In an embodiment, during path drawing, the display unit 401 is specifically configured to: connect game scenario blocks on the current game scenario path in series in the game scenario structure interface by using a first line; and connect game scenario blocks on the historical game scenario path in series in the game scenario structure interface by using a second line.

In an embodiment, a game scenario block (for example, a readable game scenario block) in the game scenario structure interface displays scenario digest information.

In an embodiment, the game scenario structure interface further displays current game progress information of the player.

Figure 4C:
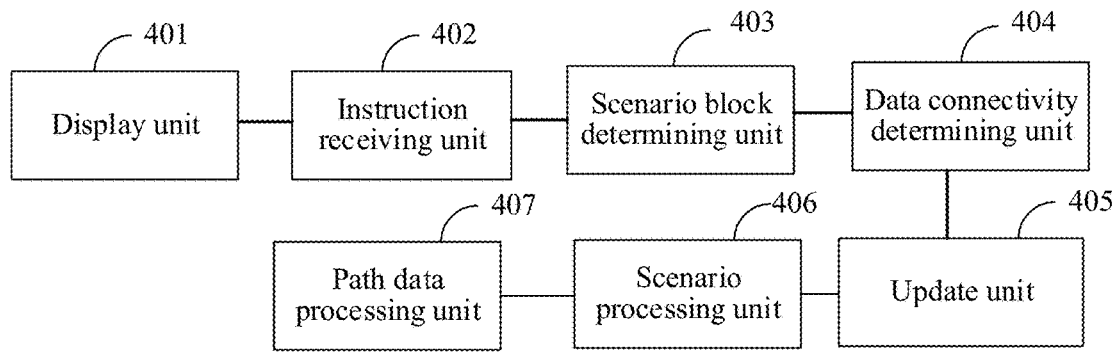
FIG. 4C is a third schematic structural diagram of an interactive scenario implementation apparatus according to an embodiment of the present disclosure.

In an embodiment, referring to FIG. 4C, the interactive scenario implementation apparatus further includes: a path data processing unit 407. The path data processing unit 407 is configured to update, in a game process when entering a game scenario corresponding to a readable game scenario block, game scenario path data stored in the readable game scenario block, based on current game scenario path data corresponding to the player when reaching the readable game scenario block.

During specific implementation, the foregoing units may be implemented as independent entities, or may be randomly combined, or may be implemented as a same entity or several entities. For specific implementation of the foregoing units, refer to the foregoing method embodiments. Details are not described herein again.

It can be known from above that, the interactive scenario implementation apparatus in one embodiment of the present disclosure may display the game scenario structure interface through the display unit 401; then receive, through the instruction receiving unit 402, the scenario skipping instruction triggered by the player through the game scenario structure interface; determine, through the scenario block determining unit 403 according to the scenario skipping instruction, the skip-origin block and the skip-destination block that needs to be skipped to, the skip-destination block storing the target game scenario path data including the target game scenario path; determine, through the data connectivity determining unit 404 when the skip-origin block is located on the target game scenario path, whether the skip-origin game scenario path data stored in the skip-origin block and the target game scenario path data have connectivity in game logic; update, through the update unit 405 when the data connectivity determining unit determines that the skip-origin game scenario path data and the target game scenario path data have connectivity in game logic, the target game scenario path data according to the skip-origin game scenario path data; and enter, through the scenario processing unit 406, the game scenario corresponding to the skip-destination block according to the updated target game scenario path data. The interactive scenario implementation apparatus may implement scenario skipping in the game.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

Figure 5:
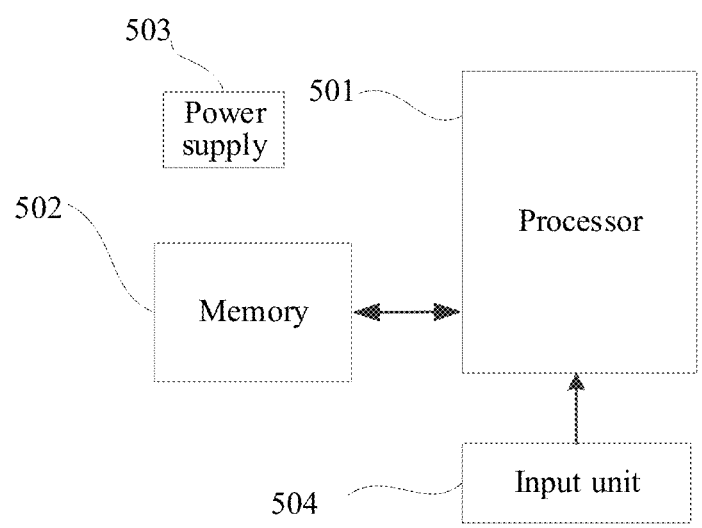
FIG. 5 is a schematic structural diagram of a terminal according to an embodiment of the present disclosure.

An embodiment of the present disclosure further provides a terminal. The terminal may be a mobile phone, a tablet computer, a mini-processing box, an unmanned aerial vehicle, an image capture device, or the like. FIG. 5 is a schematic structural diagram of a terminal according to an embodiment of the present disclosure. Specifically:

The terminal may include components such as a processor 501 with one or more processing cores, a memory 502 with one or more computer-readable storage media, a power supply 503, and an input unit 504. A person skilled in the art may understand that the terminal structure shown in FIG. 5 does not constitute a limitation on the terminal, and may include more or fewer components than shown, or combine some components, or have different component arrangements.

The processor 501 is a control center of the terminal, and connects to various parts of the terminal by using various interfaces and lines. By running or executing the software program and/or module stored in the memory 502, and invoking data stored in the memory 502, the processor performs various functions and data processing of the terminal, thereby performing overall monitoring on the terminal. Optionally, the processor 501 may include one or more processing cores. Preferably, the processor 501 may integrate an application processor and a modem processor. The application processor mainly processes an operating system, a user interface, an application program, and the like, and the modem processor mainly processes wireless communication. It may be understood that alternatively, the modem processor may not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, an application program required by at least one function (for example, a sound playback function and an image display function), and the like. The data storage area may store data created according to use of the terminal, and the like. In addition, the memory 502 may include a high-speed random access memory, and may further include a non-volatile memory, such as at least one magnetic disk storage device, a flash memory, or another volatile solid-state storage device. Correspondingly, the memory 502 may further include a memory controller, to allow the processor 501 to access the memory 502.

The terminal further includes the power supply 503 for supplying power to the components. Preferably, the power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other component.

The terminal may further include an input unit 504. The input unit 504 may be configured to receive inputted digit or character information, and generate a keyboard, mouse, joystick, optical or track ball signal input related to the user setting and function control.

Although not shown in the figure, the terminal may further include a display unit, and the like. Details are not described herein again. Specifically, in one embodiment, the processor 501 in the terminal may load executable files corresponding to processes of one or more applications to the memory 502 according to the following instructions, and the processor 501 runs an application stored in the memory 502, to implement various functions as follows:

displaying a game scenario structure interface, the game scenario structure interface including several readable game scenario blocks that a player has played, each game scenario block corresponding to one or more game scenarios, and each readable game scenario block correspondingly storing game scenario path data; receiving a scenario skipping instruction triggered by the player through the game scenario structure interface; determining, according to the scenario skipping instruction, a skip-origin block and a skip-destination block that needs to be skipped to, the skip-destination block correspondingly storing target game scenario path data including a target game scenario path; updating, when determining that the skip-origin block is located on the target game scenario path and determining that skip-origin game scenario path data of the skip-origin block and the target game scenario path data have connectivity in game logic, the target game scenario path data according to the skip-origin game scenario path data; and entering a game scenario corresponding to the skip-destination block according to updated target game scenario path data.

For example, when the skip-origin block is located on the target game scenario path, a game scenario corresponding to the skip-destination block may be further entered according to the target game scenario path data. For example, when determining that skip-origin game scenario path data and the target game scenario path data have no connectivity in game logic, a game scenario corresponding to the skip-destination block may be further entered according to the target game scenario path data.

For specific implementations of the above operations, refer to the foregoing embodiments. Details are not described herein again.

It can be known from above that, the terminal in one embodiment may display the game scenario structure interface; receive a scenario skipping instruction triggered by the player through the game scenario structure interface; determine, according to the scenario skipping instruction, the skip-origin block and the skip-destination block that needs to be skipped to; determine, when the skip-origin block is located on the target game scenario path, whether the skip-origin game scenario path data stored in the skip-origin block and the target game scenario path data have connectivity in game logic; update, when having connectivity, the target game scenario path data according to the skip-origin game scenario path data; and enter a game scenario corresponding to the skip-destination block according to updated target game scenario path data. The solution may implement game scenario skipping in a game process.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of the present disclosure provides a storage medium, storing a plurality of instructions, the instructions being capable of being loaded by a processor, to perform operations in any interactive scenario implementation method according to the embodiments of the present disclosure. For example, the instructions may perform the following steps:

displaying a game scenario structure interface, the game scenario structure interface including several readable game scenario blocks that a player has played, each game scenario block corresponding to one or more game scenarios, and each readable game scenario block storing game scenario path data; receiving a scenario skipping instruction triggered by the player through the game scenario structure interface; determining, according to the scenario skipping instruction, a skip-origin block and a skip-destination block that needs to be skipped to, the skip-destination block storing target game scenario path data including a target game scenario path; determining, when the skip-origin block is located on the target game scenario path, whether the skip-origin game scenario path data stored in the skip-origin block and the target game scenario path data have connectivity in game logic; updating, when having connectivity, the target game scenario path data according to the skip-origin game scenario path data; and entering a game scenario corresponding to the skip-destination block according to updated target game scenario path data.

The storage medium may include a read-only memory (ROM), a random access memory (RAM), a magnetic disk, an optical disc, or the like.

Because the instructions stored in the storage medium may perform the steps of any interactive scenario implementation method provided in the embodiments of the present disclosure, the instructions can implement beneficial effects that may be implemented by any interactive scenario implementation method provided in the embodiments of the present disclosure. For details, reference may be made to the foregoing embodiments. Details are not described herein again.

The interactive scenario implementation method and apparatus, the terminal, and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. An interactive scenario implementation method, performed by a computer device, the method comprising:

displaying, on a game scenario structure interface of a developed game, one or more readable game scenario blocks, each block representing one or more game scenarios that a player has played, and each readable game scenario block having a corresponding game scenario path data stored, the game having a game story framework that includes a plurality of set game scenario blocks, the game scenario blocks being configured to be connected according to a set game logic and an interaction operation of the player to generate game story scenes corresponding to the player;

receiving a scenario skipping instruction triggered by the player through the game scenario structure interface;

determining, according to the scenario skipping instruction, a skip-origin block and a skip-destination block, wherein target game scenario path data of the skip-destination block comprises a target game scenario path;

updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

2. The interactive scenario implementation method according to claim 1, wherein the skip-origin game scenario path data comprises a skip-origin game logic parameter; and the target game scenario path data further comprises a target game logic parameter; and the determining that skip-origin game scenario path data stored in the skip-origin block and the target game scenario path data have connectivity in game logic comprises:

comparing the skip-origin game logic parameter with the target game logic parameter, to obtain a comparison result;

determining, according to the comparison result, whether the skip-origin game logic parameter and the target game logic parameter are connected in the game logic; and determining, when the skip-origin game logic parameter and the target game logic parameter are connected, that the skip-origin game scenario path data and the target game scenario path data have connectivity in the game logic.

3. The interactive scenario implementation method according to claim 2, wherein the skip-origin game logic parameter comprises a player game parameter corresponding to the player when reaching the skip-origin block, and the target game logic parameter comprises a parameter judgment condition corresponding to the player game parameter; and the comparing the skip-origin game logic parameter with the target game logic parameter comprises:

determining whether the player game parameter meets the parameter judgment condition.

4. The interactive scenario implementation method according to claim 1, wherein the determining that the skip-origin block is located on the target game scenario path comprises:

finding an intersection of the target game scenario path and a skip-origin game scenario path, to obtain at least one intersection block; and determining, when the at least one intersection block comprises the skip-origin block, that the skip-origin block is located on the target game scenario path.

5. The interactive scenario implementation method according to claim 1, wherein the updating the target game scenario path data according to the skip-origin game scenario path data comprises:

constructing, according to the skip-origin game scenario path data and the target game scenario path data, new game scenario path data on reaching the skip-destination block from the skip-origin block; and updating the target game scenario path data according to the new game scenario path data.

6. The interactive scenario implementation method according to claim 5, wherein the skip-origin game scenario path data comprises a skip-origin game scenario path and a skip-origin game logic parameter; and the target game scenario path data further comprises a target game logic parameter; and the constructing, according to the skip-origin game scenario path data and the target game scenario path data, new game scenario path data on reaching a skip-destination block from the skip-origin block comprises:

constructing, according to the skip-origin game scenario path and the target game scenario path, a new game scenario path of reaching the skip-destination block; and inheriting the skip-origin game logic parameter based on the target game logic parameter, to obtain a new game logic parameter of the new game scenario path data.

7. The interactive scenario implementation method according to claim 1, further comprising:

entering, when determining that the skip-origin block is located on the target game scenario path, a game scenario corresponding to the skip-destination block according to the target game scenario path data.

8. The interactive scenario implementation method according to claim 1, further comprising:

entering, when determining that skip-origin game scenario path data and the target game scenario path data have no connectivity in the game logic, a game scenario corresponding to the skip-destination block according to the target game scenario path data.

9. The interactive scenario implementation method according to claim 1, wherein the displaying a game scenario structure interface comprises:

receiving a scenario structure display instruction triggered by the player through a game interface; and displaying the game scenario structure interface in response to the scenario structure display instruction.

10. The interactive scenario implementation method according to claim 1, wherein the displaying a game scenario structure interface comprises:

reading a current game scenario path upon receiving a scenario structure display instruction, and reading, from one block of the one or more readable game scenario blocks, a historical game scenario path corresponding to the player when reaching the one block;

drawing the current game scenario path and the historical game scenario path in the game scenario structure interface; and displaying the game scenario structure interface after the drawing.

11. The interactive scenario implementation method according to claim 10, wherein the drawing the current game scenario path and the historical game scenario path in the game scenario structure interface comprises:

connecting game scenario blocks on the current game scenario path in series in the game scenario structure interface by using a first line; and connecting game scenario blocks on the historical game scenario path in series in the game scenario structure interface by using a second line.

12. The interactive scenario implementation method according to claim 1, further comprising:

displaying, together with a game scenario block in the game scenario structure interface, corresponding scenario digest information.

13. The interactive scenario implementation method according to claim 1, further comprising:

displaying, on the game scenario structure interface, current game progress information of the player.

14. The interactive scenario implementation method according to claim 1, further comprising: updating, in a game process when entering a game scenario corresponding to one block of the one or more readable game scenario blocks, game scenario path data of the one block corresponding to the entered game scenario, based on current game scenario path data corresponding to the player.

15. The method according to claim 1, wherein:

the plurality of set game scenario blocks of the game story frame work include the one or more readable game scenario blocks and one or more unreadable game scenario blocks, each unreadable game scenario block being a block whose game scenario path data or game archive information is not stored, and the method further comprising:

displaying, on the game scenario structure interface, the one or more unreadable game scenario blocks, a scenario path connecting one or more of the game scenario blocks previously experienced by the player, wherein no entry is provided for the one or more unreadable game scenario blocks to be selected as the skip-origin block or the skip-destination block.

16. The method according to claim 15, wherein the one or more unreadable game scenario blocks include at least one of a scenario block that just has a game value stored, or a pure game scene block that just has a game ending scene or a game transitional scene stored.

17. A computer device, comprising: a processor and a memory, the memory storing a plurality of instructions; and the processor loading the instructions from the memory, to perform a plurality of operations comprising:

displaying, on a game scenario structure interface of a developed game, one or more readable game scenario blocks, each block representing one or more game scenarios that a player has played, and each readable game scenario block having a corresponding game scenario path data stored, the game having a game story framework that includes a plurality of set game scenario blocks, the game scenario blocks being configured to be connected according to a set game logic and an interaction operation of the player to generate game story scenes corresponding to the player;

receiving a scenario skipping instruction triggered by the player through the game scenario structure interface;

determining, according to the scenario skipping instruction, a skip-origin block and a skip-destination block, wherein target game scenario path data of the skip-destination block comprises a target game scenario path;

updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

18. The computer device according to claim 17, wherein the skip-origin game scenario path data comprises a skip-origin game logic parameter; and the target game scenario path data further comprises a target game logic parameter; and the determining that skip-origin game scenario path data stored in the skip-origin block and the target game scenario path data have connectivity in game logic comprises:

comparing the skip-origin game logic parameter with the target game logic parameter, to obtain a comparison result;

determining, according to the comparison result, whether the skip-origin game logic parameter and the target game logic parameter are connected in the game logic; and determining, when the skip-origin game logic parameter and the target game logic parameter are connected, that the skip-origin game scenario path data and the target game scenario path data have connectivity in the game logic.

19. The computer device according to claim 18, wherein the skip-origin game logic parameter comprises a player game parameter corresponding to the player when reaching the skip-origin block, and the target game logic parameter comprises a parameter judgment condition corresponding to the player game parameter; and the comparing the skip-origin game logic parameter with the target game logic parameter comprises:

determining whether the player game parameter meets the parameter judgment condition.

20. A non-transitory storage medium, storing a plurality of instructions, the instructions being configured to be loaded by a processor and cause the processor to perform a plurality of operations comprising:

displaying, on a game scenario structure interface of a developed game, one or more readable game scenario blocks, each block representing one or more game scenarios that a player has played, and each readable game scenario block having a corresponding game scenario path data stored, the game having a game story framework that includes a plurality of set game scenario blocks, the game scenario blocks being configured to be connected according to a set game logic and an interaction operation of the player to generate game story scenes corresponding to the player;

receiving a scenario skipping instruction triggered by the player through the game scenario structure interface;

determining, according to the scenario skipping instruction, a skip-origin block and a skip-destination block, wherein target game scenario path data of the skip-destination block comprises a target game scenario path;

updating, upon determining that the skip-origin block is located on the target game scenario path and determining that skip-origin game scenario path data of the skip-origin block and the target game scenario path data have connectivity in game logic, the target game scenario path data according to the skip-origin game scenario path data, to obtain updated target game scenario path data; and entering a game scenario corresponding to the skip-destination block according to the updated target game scenario path data.

* * * * *